US012282980B2

(12) United States Patent
Fu

(10) Patent No.: US 12,282,980 B2

(45) Date of Patent: Apr. 22, 2025

(54) PICTURE LOADING METHOD AND RELATED APPARATUS

(71) Applicant: Huawei Technologies Co., Ltd., Shenzhen (CN)

(72) Inventor: Wei Fu, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 36 days.

(21) Appl. No.: 17/919,880

(22) PCT Filed: Apr. 20, 2021

(86) PCT No.: PCT/CN2021/088262

§ 371 (c)(1),
(2) Date: Oct. 19, 2022

(87) PCT Pub. No.: WO2021/213351

PCT Pub. Date: Oct. 28, 2021

(65) Prior Publication Data

US 2023/0162317 A1 May 25, 2023

(30) Foreign Application Priority Data

Apr. 20, 2020 (CN) ......................... 202010314065.9

(51) Int. Cl.
*G06T 1/20* (2006.01)
*H04N 19/186* (2014.01)
*H04N 21/4402* (2011.01)

(52) U.S. Cl.
CPC ............ *G06T 1/20* (2013.01); *H04N 19/186* (2014.11); *H04N 21/440218* (2013.01)

(58) Field of Classification Search
CPC ........... G06T 1/20; G06T 9/00; H04N 19/186; H04N 21/440218
See application file for complete search history.

(56) References Cited

U.S. PATENT DOCUMENTS 6,587,588 B1 7/2003 Bottou et al.
6,606,040 B2 * 8/2003 Abdat ................ H03M 7/3088 341/87

(Continued)

FOREIGN PATENT DOCUMENTS

CN 101226470 A 7/2008
CN 102013105 A 4/2011

(Continued)

OTHER PUBLICATIONS

Jin Zhenxun et al, A Lossless Image Compression Algorithmwith High Compression Ratioin Decoding Process of Embedded System, Bulletin of Science and Technology, Vo. 29, No. 9, Sep. 2013, with the English Abstracts, 3 pages.

*Primary Examiner* — Ming Wu

(74) *Attorney, Agent, or Firm* — Conley Rose, P.C.

(57) ABSTRACT

A picture loading method includes an electronic device that obtains a first picture file. The first picture file includes a format field and a data field. The format field indicates a source format of the first picture file, and the data field includes pixel data of the first picture file. The electronic device determines, based on the source format of the first picture file, a rendering operation corresponding to the first picture file and renders the first picture file on a display.

20 Claims, 10 Drawing Sheets

(56) References Cited

U.S. PATENT DOCUMENTS

| | | | | |
|---|---|---|---|---|
| 6,983,074 | B1 | 1/2006 | Clauson et al. | |
| 9,218,689 | B1 * | 12/2015 | Baldwin | G06T 7/60 |
| 10,757,347 | B1 * | 8/2020 | Corwin | H04N 21/4316 |
| 2002/0196853 | A1 * | 12/2002 | Liang | H04N 19/90 375/E7.206 |
| 2006/0041840 | A1 * | 2/2006 | Blair | G06Q 10/087 715/234 |
| 2013/0194288 | A1 | 8/2013 | Weng et al. | |
| 2020/0077122 | A1 * | 3/2020 | Alakuijala | H04N 19/44 |
| 2020/0196853 | A1 * | 6/2020 | van Hemert | G06V 10/70 |
| 2021/0090413 | A1 * | 3/2021 | Nystrom | H04N 19/174 |

FOREIGN PATENT DOCUMENTS

| | | | |
|---|---|---|---|
| CN | 102244784 | A | 11/2011 |
| CN | 102567381 | A | 7/2012 |
| CN | 103124350 | A | 5/2013 |
| CN | 104142924 | A | 11/2014 |
| CN | 107066430 | A | 8/2017 |
| CN | 109408612 | A | 3/2019 |
| EP | 2618582 | A1 | 7/2013 |

* cited by examiner

PSRAM: Pseudo static random access memory    Flash: Flash memory

MCU: Microcontroller unit    LCD: Display

| Control bit | Color format | Compression algorithm |
| --- | --- | --- |
| Picture width | | Picture height |
| Bitmap data | | |

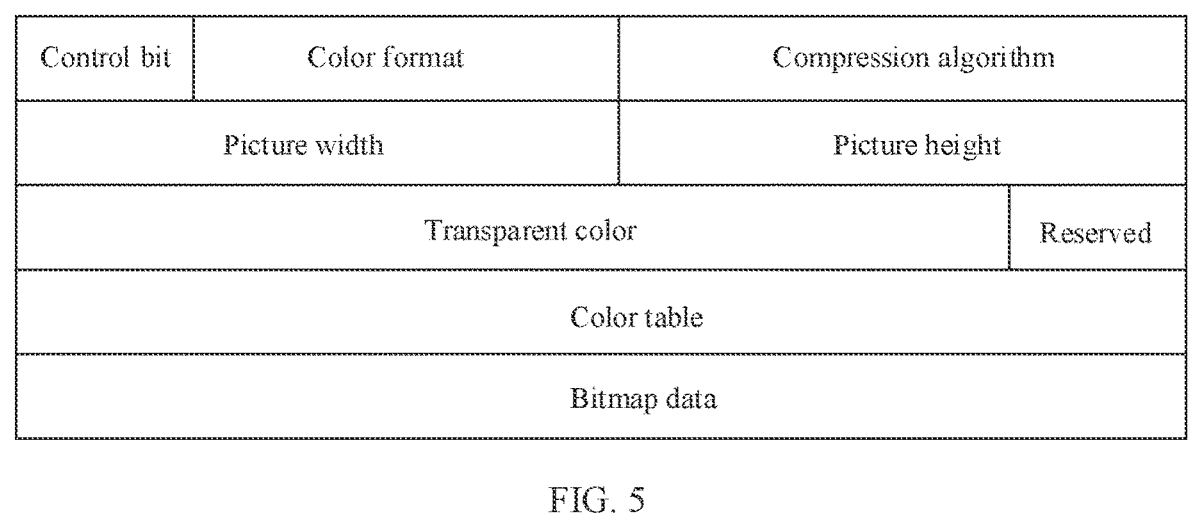

<table>
<tr><td>Control bit</td><td>Color format</td><td colspan="2">Compression algorithm</td></tr>
<tr><td colspan="2">Picture width</td><td colspan="2">Picture height</td></tr>
<tr><td colspan="3">Transparent color</td><td>Reserved</td></tr>
<tr><td colspan="4">Color table</td></tr>
<tr><td colspan="4">Bitmap data</td></tr>
</table>

FIG. 5

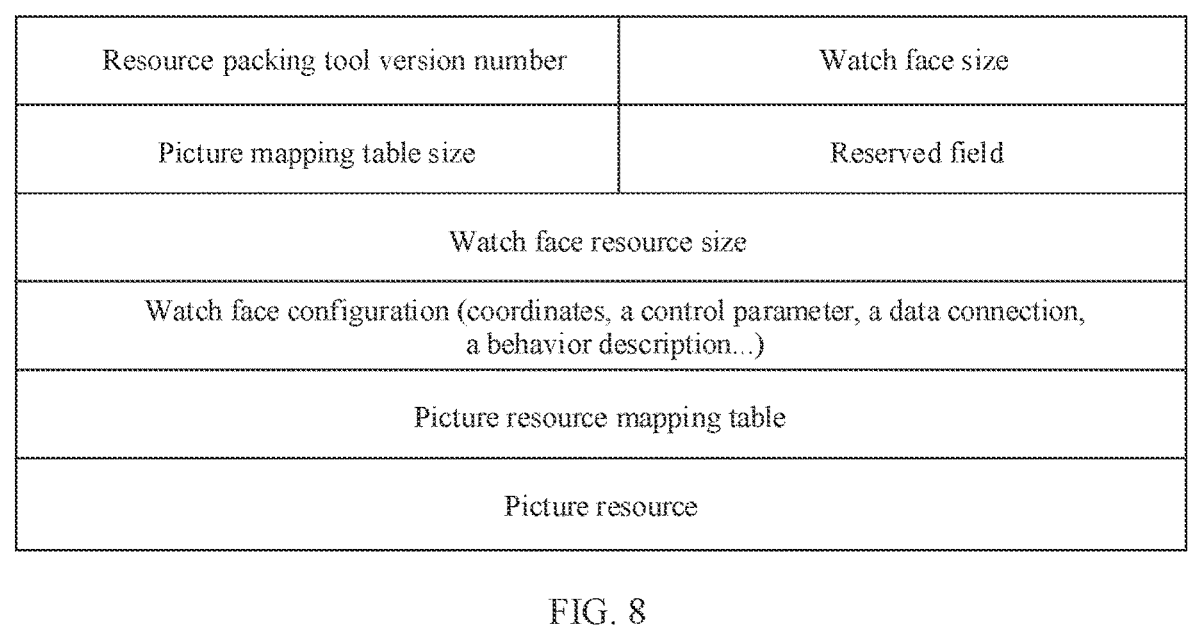

| Resource packing tool version number | Watch face size |
|---|---|
| Picture mapping table size | Reserved field |
| Watch face resource size | |
| Watch face configuration (coordinates, a control parameter, a data connection, a behavior description...) | |
| Picture resource mapping table | |
| Picture resource | |

FIG. 8

PICTURE LOADING METHOD AND RELATED APPARATUS

CROSS-REFERENCE TO RELATED APPLICATIONS

This is a U.S. National Stage of International Patent Application No. PCT/CN2021/088262 filed Apr. 20, 2021, which claims priority to Chinese Patent Application No. 202010314065.9 filed Apr. 20, 2020. Both of the aforementioned applications are hereby incorporated by reference in their entireties.

TECHNICAL FIELD

This application relates to the field of image processing, and in particular, to a picture loading method and a related apparatus.

BACKGROUND

A processor in an embedded system usually has a relatively small internal memory, and therefore, the internal memory is generally used as stack space for code running. UI page display related resources such as pictures and font libraries are usually cached by using an external PSRAM (Pseudo static random access memory, pseudo static random access memory). Adding a PSRAM greatly affects hardware costs, power consumption, and battery life of a product. Therefore, a size of the PSRAM is usually not configured to ensure that picture resources of all pages are cached. As a result, during page switching, a picture resource of a previous page needs to be cleared to load a resource of a new page. A size of the picture resource greatly affects a response time during the page switching.

In a conventional technology 1, a picture loading solution provided by a UI framework in a current embedded system is generally converting a portable network graphics (Portable Network Graphics, PNG) picture to a bitmap (bitmap, BMP) format by using a tool, then compiling picture data into code of an electronic device, and directly loading the code into an internal memory of a processor. To avoid affecting storage and loading of a picture, source formats of all pictures in the electronic device need to be unified. In a scenario including transparent overlay, all the pictures of the electronic device need to be in an ARGB8888 format. However, in this manner, code storage space is occupied when a picture is loaded. As a result, a quantity of pictures that can be loaded is limited. In addition. ARGB8888 has 32 bits, while such a large quantity of colors are not used in most scenarios, leading to a waste of storage space.

In a conventional technology 2, after converted from the PNG to the ARGB8888 32-bit BMP format, a picture is compressed to generate a bin file, and the bin file is stored in a flash. A picture resource is loaded into a PSRAM as required during system running. However, it takes time to load the picture resource from the flash to an internal memory. When a page is complex, a page response time is relatively long, leading to poor user experience.

Therefore, how to reduce a picture storage size and improve a picture loading speed becomes a problem that needs to be resolved.

SUMMARY

Embodiments of this application provide a picture loading method and a related apparatus, to reduce a picture storage size and improve a picture loading speed.

According to a first aspect, this application provides a picture loading method. The method is applied to an electronic device. The method may include: The electronic device obtains a first picture file. The first picture file includes a format field and a data field, the format field is used to indicate a source format of the first picture file, and the data field includes pixel data of the first picture file. The electronic device determines, based on the source format of the first picture file, a rendering operation corresponding to the first picture file. The electronic device renders the first picture file onto a display based on the rendering operation corresponding to the first picture file.

By implementing the method in the first aspect, the electronic device determines the rendering operation on the first picture file by using the source format of the first picture file, where different source formats correspond to different rendering operations; and displays the first picture file on the display. In this manner, the electronic device may support inputs of pictures in different source formats, and then display the pictures on the display in different rendering manners, so that a picture storage resource can be saved, and a picture storage size can be reduced. For example, in a scenario including transparent overlay, pictures in the electronic device do not need to be all in an ARGB8888 format. Only pictures used in the scenario including transparent overlay need to be in the ARGB8888 format, and a picture used in a scenario without transparent overlay is in an RGB24 or RGB16 format. In this way, a picture storage resource can be saved without affecting a display effect. This reduces time required to load a picture resource from a flash to an internal memory, and improves user experience.

With reference to the first aspect, in some embodiments, when the source format of the first picture file is a first format, the rendering operation includes: controlling transparency of the first picture file by using a transparent channel, and displaying the first picture file with a transparent effect on the display. The first format supports the transparent channel. This manner provides an example rendering operation. When the source format of the first picture file supports the transparent channel, the rendering operation performed by the electronic device on the first picture file includes transparent computing, that is, the first picture file may have a transparent effect when displayed on the display.

With reference to the first aspect, in some embodiments, when the source format of the first picture file is a second format, the rendering operation includes: displaying, on the display, the first picture file blocking another picture file. This manner provides another example rendering operation. When the source format of the first picture file does not support the transparent channel, the rendering operation performed by the electronic device on the first picture file includes directly overlaying the first picture file on another picture, and blocking the another picture.

With reference to the first aspect, in some embodiments, the method further includes: The electronic device obtains a second picture file. The second picture file includes a format field and a data field, the format field is used to indicate a source format of the second picture file, and the data field includes pixel data of the second picture file. That the electronic device determines, based on the format field of the first picture file, a rendering operation corresponding to the first picture file specifically includes: The electronic device determines, based on the format field of the first picture file and the second picture file, the rendering operation corresponding to the first picture file. When the second picture file is a background picture, for different background pictures, the electronic device may perform different rendering operations on the first picture file. Specifically, the electronic device may overlay and display the first picture file on the second picture file, or the electronic device may overlay and display the first picture file on the second picture file based on different transparency, or the electronic device may overlay and display the first picture file on different positions of the second picture file, or the electronic device may overlay and display the first picture file on the second picture file in different sizes or ratios.

With reference to the first aspect, in some embodiments, before the electronic device obtains the first picture file, the method further includes: The electronic device obtains a source file of the first picture file, and performs format conversion on the source file of the first picture file to obtain the first picture file. In some embodiments, before the electronic device obtains the second picture file, the method further includes: The electronic device obtains a source file of the second picture file, and performs format conversion on the source file of the second picture file to obtain the second picture file. The source file of the first picture file and the source file of the second picture file may be in different formats (for example, a BMP format and a PNG format). and the first picture file and the second picture file are in a same format. That is, the electronic device may support inputs of pictures in different source formats, and then perform format conversion to a same format, to facilitate storage and loading of the pictures by the electronic device.

In some embodiments, the performing format conversion on the source file of the first picture file to obtain the first picture file includes: compressing the source file of the first picture file based on a preset compression algorithm; and if a compression ratio is greater than or equal to a threshold, filling pixel data after the compression into the data field of the first picture file; or if the compression ratio is less than the threshold, filling pixel data before the compression into the data field of the first picture file, where the compression ratio is a ratio of a size of the source file of the first picture file before the compression to a size after the compression. In some embodiments, the threshold may be related to a computing capability or a file reading speed of the electronic device. The process of determining whether the compression ratio is greater than or equal to the threshold may avoid a situation in which the picture file occupies more storage resources of the electronic device after the compression, and optimize a processing effect on the picture.

In some embodiments, a decompression algorithm is provided for the compression algorithm, to decompress the first picture file before image rendering. Before the electronic device renders the first picture file onto the display based on the rendering operation corresponding to the first picture file, the method further includes: The electronic device determines whether the data field of the first picture file is a compressed field; and if the data field is a compressed field, decompresses the data field of the first picture file based on the preset decompression algorithm, and fills pixel data after the decompression into the data field of the first picture file; or if the data field is not a compressed field, skips changing the data field of the first picture file.

With reference to the first aspect, in some embodiments, the first picture file further includes a transparent color field, and the transparent color field is used to indicate a transparently displayed color area in the first picture file. With the transparent color field provided in this application, a picture that does not support the transparent channel may have a transparent effect when displayed on the display. This expands a use range of a picture format that does not support the transparent channel, and further saves a storage resource of the electronic device.

In some embodiments, when the source format of the first picture file is a third format, that the electronic device renders the first picture file onto a display based on the rendering operation corresponding to the first picture file specifically includes: determining whether the transparent color field of the first picture file is valid. If the transparent color field is valid, the electronic device performs transparency processing on the first picture file based on the transparent color field, so that the color area corresponding to the transparent color field in the first picture file has a transparent effect on the display. If the transparent color field is not valid, the electronic device displays, on the display, the first picture file blocking the another picture. That is, even though the third format does not support the transparent channel, if the transparent color field of the first picture file is valid, the first picture file may still have a transparent effect on the display. That is, the color area corresponding to the transparent color field is displayed as transparent on the display and does not block the another picture. In this manner, when a picture originally requires a format supporting the transparent channel, the third format may also be used, thereby reducing a picture storage size, and improving a picture loading speed.

With reference to the first aspect, in some embodiments, the method further includes: obtaining configuration information of the electronic device. The configuration information includes a size of the display and a display configuration of the display. That the electronic device determines, based on the format field of the first picture file, a rendering operation corresponding to the first picture file specifically includes: The electronic device determines, based on the first format field of the first picture file and the configuration information, the rendering operation corresponding to the first picture file. The electronic device determines a display ratio of the first picture file by using the size of the display, and perform format conversion on the first picture file by using the display configuration (for example, a display format) of the display, so that the first picture file can be displayed on the display.

With reference to the first aspect, in some embodiments, the rendering operation includes one or more of the following: scaling, rotation, and transparent computing. The scaling operation is used to control a size or a ratio of a picture file to be displayed on the display, the rotation operation is used to control a rotation effect of a picture file to be displayed on the display, and the transparency computing is used to control transparency of a picture file to be displayed on the display. An operation manner and step of the rendering operation are not limited in this application.

With reference to the first aspect, in some embodiments, the first picture file further includes a palette field, the palette field is used to indicate a mapping relationship between a pixel color of the first picture file and an index number, and one index number represents one color. With the palette field provided in this application, a size of the first picture file may be compressed by representing a pixel color by using an index number.

According to a second aspect, this application provides an electronic device. The electronic device ma include one or more processors, a memory, and a display. The memory and the display are coupled to the one or more processors, the memory is configured to store computer program code, the computer program code includes computer instructions, and the one or more processors invoke the computer instructions to enable the electronic device to perform the following operations:

obtaining a first picture file, where the first picture file includes a format field and a data field, the formal field is used to indicate a source format of the first picture file, and the data field includes pixel data of the first picture file; determining, based on the source format of the first picture file, a rendering operation corresponding to the first picture file; and rendering the first picture file onto the display based on the rendering operation corresponding to the first picture file.

With reference to the second aspect, in some embodiments, when the source format of the first picture file is a first format, the rendering operation includes: controlling transparency of the first picture file by using a transparent channel, and displaying the first picture file with a transparent effect on the display. The first format supports the transparent channel.

With reference to the second aspect, in some embodiments, when the source format of the first picture file is a second format, the rendering operation includes: displaying, on the display, the first picture file blocking another picture file.

With reference to the second aspect, in some embodiments, the electronic device further includes: obtaining a second picture file, where the second picture file includes a format field and a data field, the format field is used to indicate a source format of the second picture file, and the data field includes pixel data of the second picture file. The determining, based on the format field of the first picture file, a rendering operation corresponding to the first picture file specifically includes: determining, based on the format field of the first picture file and the second picture file, the rendering operation corresponding to the first picture file.

With reference to the second aspect, in some embodiments, before the obtaining a first picture file, the electronic device further includes: obtaining a source file of the first picture file, and performing format conversion on the source file of the first picture file to obtain the first picture file. In some embodiments, before the obtaining a second picture file, the electronic device further includes: obtaining, by the electronic device, a source file of the second picture file, and performing format conversion on the source file of the second picture file to obtain the second picture file. The source file of the first picture file and the source file of the second picture file may be in different formats (for example, a BMP format and a PNG format), and the first picture file and the second picture file are in a same format. That is, the electronic device may support inputs of pictures in different source formats, and then perform format conversion to a same format, to facilitate storage and loading of the pictures by the electronic device.

In some embodiments, the performing format conversion on the source file of the first picture file to obtain the first picture file includes: compressing the source file of the first picture file based on a preset compression algorithm; and if a compression ratio is greater than or equal to a threshold, filling pixel data after the compression into the data field of the first picture file; or if the compression ratio is less than the threshold, filling pixel data before the compression into the data field of the first picture file, where the compression ratio is a ratio of a size of the source file of the first picture file before the compression to a size after the compression.

In some embodiments, before the rendering the first picture file onto the display based on the rendering operation corresponding to the first picture file, the electronic device further includes: determining whether the data field of the first picture file is a compressed field; and if the data field is a compressed field, decompressing the data field of the first picture file based on a preset decompression algorithm, and filling pixel data after the decompression into the data field of the first picture file; or if the data field is not a compressed field, skipping changing the data field of the first picture file.

With reference to the second aspect, in some embodiments, the first picture file further includes a transparent color field, and the transparent color field is used to indicate a transparently displayed color area in the first picture file.

In some embodiments, when the source format of the first picture file is a third format, the rendering the first picture file onto the display based on the rendering operation corresponding to the first picture file specifically includes: determining whether the transparent color field of the first picture file is valid; and if the transparent color field is valid, performing transparency processing on the first picture file based on the transparent color field, so that the color area corresponding to the transparent color field in the first picture file has a transparent effect on the display; or if the transparent color field is not valid, displaying, on the display, the first picture file blocking the another picture.

With reference to the second aspect, in some embodiments, the electronic device further includes: obtaining configuration information. The configuration information includes a size of the display and a display configuration of the display. The determining, based on the format field of the first picture file, a rendering operation corresponding to the first picture file specifically includes: determining, based on the first format field of the first picture file and the configuration information, the rendering operation corresponding to the first picture file.

With reference to the second aspect, in some embodiments, the rendering operation includes one or more of the following: scaling, rotation, and transparent computing.

With reference to the second aspect, in some embodiments, the first picture file further includes a palette field, the palette field is used to indicate a mapping relationship between a pixel color of the first picture file and an index number, and one index number represents one color.

According to a third aspect, an embodiment of this application provides a computer storage medium, including computer instructions. When the computer instructions are run on an electronic device, the electronic device is enabled to perform the picture loading method in any possible implementation of the first aspect.

According to a fourth aspect, an embodiment of this application provides a computer program product. When the computer program product runs on a computer, the computer is enabled to perform the picture loading method in any possible implementation of the first aspect.

It may be understood that the electronic device provided in the second aspect, the computer storage medium provided in the third aspect, and the computer program product provided in the fourth aspect are all configured to perform the picture loading method provided in the first aspect. Therefore, for beneficial effects that can be achieved by them, refer to beneficial effects in the method provided in the first aspect. Details are not described herein again.

BRIEF DESCRIPTION OF DRAWINGS

FIG. 5 shows another picture encoding format according to an embodiment of this application;

FIG. 8 shows an installation data package format according to an embodiment of this application;

DESCRIPTION OF EMBODIMENTS

Figures 1, 2:
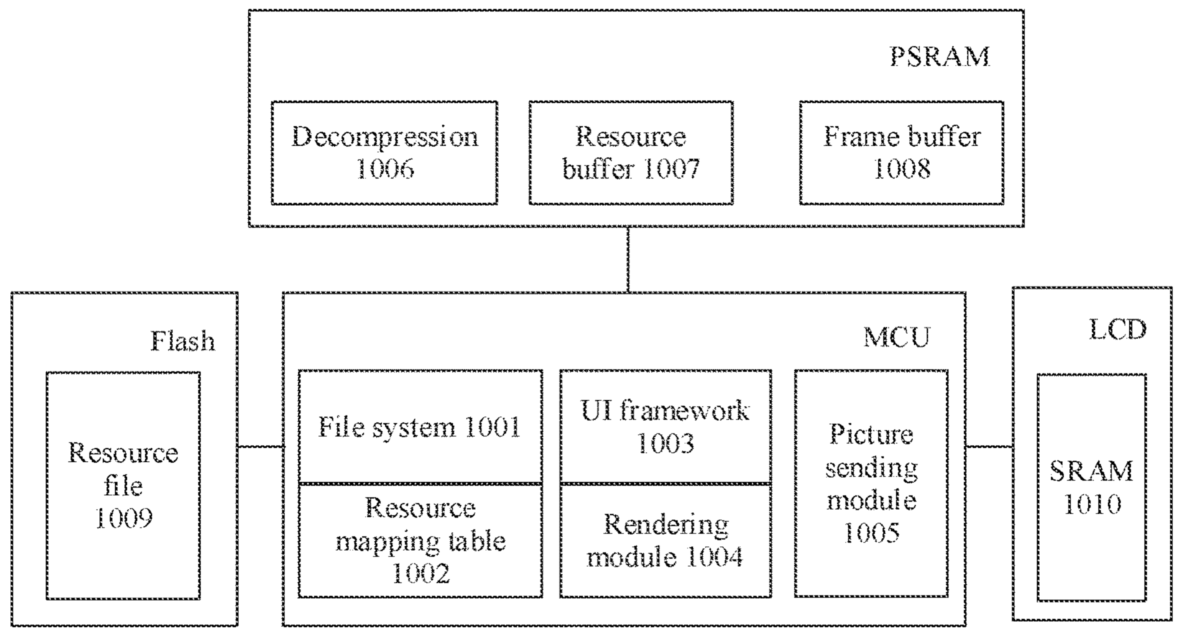
FIG. 1 is a diagram of a system architecture of a picture loading method according to an embodiment of this application.
FIG. 2 shows a picture encoding format according to an embodiment of this application.

The technical solutions according to embodiments of this application are clearly and completely described below with reference to the accompanying drawings. In descriptions of embodiments of this application, unless otherwise stated. "/" represents a meaning of or, for example, A/B may represent A or B; "and/or" in this specification is merely an association relationship for describing associated objects and represents that three relationships may exist, for example, A and/or B may represent the following three cases: Only A exists, both A and B exist, and only B exists. In addition, in descriptions of embodiments of this application, unless otherwise stated, "a plurality of" means two or more than two.

The terms "first" and "second" mentioned below are merely intended for a purpose of description, and shall not be understood as an indication or implication of relative importance or implicit indication of the quantity of indicated technical features. Therefore, features defined with "first" and "second" may explicitly or implicitly include one or more such features. In descriptions of embodiments of this application, unless otherwise stated, "a plurality of" means two or more than two.

An electronic device in embodiments of this application may be a device with a display function, such as a mobile phone, a tablet computer, a desktop computer, a laptop, an ultra-mobile personal computer (Ultra-mobile Personal Computer, UMPC), a handheld computer, a netbook, a personal digital assistant (Personal Digital Assistant, PDA), a wearable electronic device (for example, a sports watch, a smart band, or a smart watch), a virtual reality device, an in-vehicle multimedia device, an intelligent home device, or a medical device.

First, some related backgrounds in this application are explained, to facilitate understanding by persons skilled in the art.

(1) A non-embedded system usually uses a compressed picture format such as PNG, and completes rendering by using a graphics processing unit (Graphics Processing Unit, GPU), to reduce resource overheads. However, for an embedded system, due to a relatively low dominant frequency and poor computing performance of the embedded system, a picture in a format such as PNG is generally converted to a BMP format before used.

(2) BMP color formats include an RGB16 format, an RGB24 format, and an RGB32 format.

Each pixel in the RGB16 format is represented by 16 bits. One pixel occupies 2 bytes. Generally, there are two formats: RGB565 and RGB555. RGB components R (red), G (green), and B (blue) of RGB565 use 5 bits, 6 bits, and 5 bits respectively. RGB components R, G, and B of RGB555 use 5 bits, 5 bits, and 5 bits respectively, and the most significant bit is not used.

Each pixel in the RGB24 format is represented by 24 bits. One pixel occupies 3 bytes. Generally, an RGB888 format is used. RGB components R, G, and B of RGB888 use 8 bits, 8 bits, and 8 bits, respectively.

Each pixel in the RGB32 format is represented by 32 bits. One pixel occupies 4 bytes. Generally, an ARGB8888 format is used. The ARGB8888 format is essentially RGB24 with an alpha channel. RGB components R, G, and B of RGB32 use 8 bits, 8 bits, and 8 bits respectively, and 8 bits reserved are used to indicate transparency, that is, an alpha value.

Pictures in the RGB16 and RGB24 formats do not have a transparent channel. Therefore, a blockage problem occurs in a scenario in which pictures are overlaid one on another. If pictures are not overlaid one on another, generally, the RGB16 (RGB565/555) or RGB24 (RGB888) format may be used as an original picture resource format. If pictures are overlaid one on another, generally, the RGB32 (ARGB8888) format is used.

(3) BMP compression method

① Palette

An image is represented by using an index, and the palette is a mapping table between an index and a color corresponding to the index. That is, a byte is used to represent a color. When a picture is stored, a combination of numbers and mappings from numbers to picture colors are stored. In this manner, only a limited quantity of colors, usually 256 colors, can be stored, and correspondingly, in a computer system, a 1-byte number is used to retrieve a color. Based on use of the palette, color indexes instead of RGBA are used to describe colors. An advantage of using the palette lies in that a compression ratio 25% can be achieved. A disadvantage lies in that the palette is limited in application scenarios due to a relatively small quantity of colors. In addition, when a picture is relatively small, overheads of the palette may cause a low compression ratio or negative compression.

② Merge consecutive identical pixels

For example, 13 consecutive identical red pixels may be merged and represented as "F Red 13". F is a compression flag, Red is a color, and 13 is a quantity of colors. During decompression, after the compression flag F is encountered, the subsequent 13 consecutive colors are decompressed. An advantage of this compression algorithm is that execution efficiency is very high. A disadvantage is that if a picture does not have a consecutive large-area solid color block, a compression ratio is very low, and even data expansion and negative compression may occur.

(4) image rendering

Image rendering is a process of displaying a picture on a display. Before the picture is rendered to the display, original pixel data of the picture needs to be obtained. If the picture is a compressed picture, the picture needs to be decompressed first.

An image rendering process includes: first obtaining coordinates of a picture; providing the coordinates to a vertex shader (to compute vertices of the image); rasterizing the picture (to obtain pixels corresponding to the picture on a screen); performing computing by using a fragment shader (to compute a final display color value of each pixel, where if there is a transparency value, the color of each pixel needs to be multiplied by the transparency value); and performing rendering from a frame buffer to the screen.

Next, for ease of understanding embodiments of this application, the following specifically analyzes a system architecture in embodiments of this application. FIG. 1 is an example diagram of a system architecture of a picture loading method according to this application.

As shown in FIG. 1, the system architecture may include an MCU (Microcontroller Unit, microcontroller unit), a flash memory (flash), and a PSRAM (Pseudo static random access memory, pseudo static random access memory), and a display LCD.

MCU: Microcontroller Unit, microcontroller unit, which is also referred to as a single chip microcomputer (Single Chip Microcomputer). The MCU is a chip-level computer formed by integrating a CPU. memories (a RAM and a ROM), and a plurality of I/O interfaces on one chip, and performs control in different combinations for different application scenarios.

In embodiments of this application, an on-chip SRAM of the MCU includes a related. management module and table resource of a file system 1001. An on-chip ROM of the MCU includes a resource mapping table 1002. The resource mapping table 1002 is a resource mapping table generated by using a picture resource packaging tool when a resource file 1009 is generated. A required resource file may be conveniently found in the resource file 1009 by using the resource mapping table 1002.

The MCU further includes a UI framework 1003, a rendering module 1004, and a picture sending module 1005. The UI framework 1003 is in the on-chip ROM of the MCU, and may be implemented only by software. The rendering module 1004 and the picture sending module 1005 may be peripheral modules, configured to perform picture rendering and picture output.

SRAM: Static Random Access Memory, static random access memory, which is one type of random access memories. The "static" means that data stored in the memory can be kept constantly provided that the memory is powered on, no refresh operation is required, and a speed is fast. In contrast, data stored in a dynamic random access memory (DRAM) needs to be updated periodically. To accelerate transmission of data inside the MCU, an SRAM is usually designed inside the MCU.

However, the SRAM has a relatively small capacity, and therefore, the SRAM is generally used as stack space for code running. UI page display related resources such as pictures and font libraries are usually cached by using an external PSRAM.

PSRAM: Pseudo static random access memory, pseudo static random access memory, which has a larger capacity than the SRAM. Because the PSRAM is a volatile memory, UI resources (such as font libraries and pictures) need to be stored in the ROM or the external flash. Because the ROM of the MCU usually has small space and is mainly configured to store code instructions, the most common practice is to store the picture resource file 1009 in the flash, and load the picture resource to the PSRAM during running after power-on.

In embodiments of this application, the PSRAM may include a decompression module 1006, a resource butler module 1007, and a frame buffer module 1008. The decompression module 1006 is configured to decompress an obtained picture resource. The resource buffer module 1007 is configured to cache UI page display related resources such as pictures and font libraries. The decompression module 1006, the resource buffer module 1007, and the frame buffer module 1008 are only functional division, and are not related to hardware division.

Flash: one type of memory chips, which is also referred to as a flash memory. The flash combines advantages of a ROM and a RAM, which not only has erasable and programmable performance, but also can read data fast, so that the data is not lost due to a power failure.

In embodiments of this application, the picture resource file 1009 is stored in the flash, When an electronic device is powered on or a display page is switched, the MCU reads a picture resource from the resource file 1009 of the flash into the resource buffer 1007 of the PSRAM by searching the resource mapping table 1002 of the ROM and using the file system 1001. If the picture read by the MCU from the resource file 1009 is compressed, the picture needs to pass through the decompression 1006 before reaching the resource buffer 1007, and the picture in the resource buffer 1007 is used by the UI framework 1003. Then, the picture in the resource buffer 1007 is rendered by the UI framework 1003 and the rendering module 1004, then output to the frame buffer module 1008, output to the display LCD by the picture sending module 1005, and displayed on the display LCD, thereby completing loading of the picture.

A default picture loading solution provided by a current embedded UI framework is usually to convert a PNG picture to a BMP format by using a tool, compress the picture to generate a bin file, and store the bin file in a flash. A picture resource is loaded into a PSRAM as required during system running. lb facilitate storage and loading of a picture, source formats of all pictures in the electronic device need to be unified. In a scenario including transparent overlay, all the pictures of the electronic device need to be in an ARGB8888 format.

However, in most scenarios, transparency and such a high color quantity do not need to be supported, and using the ARGB8888 format for all the pictures of the electronic device wastes resources. In addition, it takes time to load the picture resource from the flash to an internal memory. When a page is complex, a picture loading time is relatively long, and a page response time is relatively long, leading to poor experience.

For the foregoing technical problem, an embodiment of this application proposes a new picture encoding format, to implement a unified format by performing format conversion on different types of source picture formats, thereby minimizing resource occupation and optimizing loading performance without affecting a display effect.

FIG. 2 shows an example picture encoding format according to an embodiment of this application. The picture encoding format includes a control bit, a color format, a compression algorithm, a picture width, a picture height, and bitmap data.

A control attribute of the control bit includes whether a transparent channel alpha is supported. For example, if the picture is in the ARGB8888 format, the control bit indicates that the transparent channel is supported. For example, there are 4 control bits. If the picture is in the ARGB8888 format, a field of the control bits is 1000, indicating that the transparent channel is supported. If the picture is in the RGB888, RGB565, or RGB555 format, a field of the control bits is 0000, indicating that the transparent channel is not supported.

The color format is a color format of the picture, including the RGB888 format, the ARGB888 format, the RGB565/555 format, and the like. For example, 0x888 may be used to represent the RGB888 color format. If the control attribute of the control bit indicates that the transparent channel is supported, the color format is the ARGB888 format. If the control attribute of the control bit indicates that the transparent channel is not supported, the color format is the RGB888 format. 0x565 may be used to represent the RGB565 format, and 0x555 may be used to represent the RGB555 format.

In this application, a field indicating a format of a picture may be referred to as a format field. For example, if the control attribute of the control bit and the color format jointly indicate that the picture is in the ARGB888 format, a format field of the picture includes the control bit and the color format.

The compression algorithm is, for example, an algorithm of merging consecutive identical pixels, When a compression ratio does not reach a threshold, compression may be not selected. The compression ratio is a size of space occupied before the compression/a size of space occupied after the compression. For example, 0x00AA may be used to indicate that consecutive identical pixels are merged, and 0x0000 may be used to indicate that compression is not performed, For the picture width/picture height, Width * Height determines a quantity of pixels in the bitmap data.

The bitmap data is pixel data used to display an actual image. For example, one pixel in ARGB8888 occupies 4 bytes, and the bitmap data includes Picture width * Picture height *4. One pixel in RGB888 occupies 3 bytes, and the bitmap data includes Picture width * Picture height *3. One pixel in RGB565 occupies 2 bytes, and the bitmap data includes Picture width * Picture height *2. In this application, the bitmap data may be referred to as a data field.

In the foregoing provided picture encoding format, pictures in different formats may be described by using the control bit field and the color format field. That is, with the picture encoding format, different types of picture formats may be encoded to implement a unified format, to improve storage and loading efficiency of the pictures.

A sequence, lengths, names, and division of the fields in the picture encoding format are not limited in this application.

With the picture encoding format, in this application, different source formats may be used for different pictures respectively based on features of the pictures, and then format conversion is performed on pictures in different source formats, to implement a unified format. It is unnecessary to use a same format as source formats of all pictures in the electronic device for format unification. For example, in a scenario including transparent overlay, pictures in the electronic device do not need to be all in the ARGB8888 format. Only pictures used in the scenario including transparent overlay need to be in the ARGB8888 format, and a picture used in a scenario without transparent overlay is in the RGB24 or RGB16 format. Then, format conversion is performed on ARGB8888, RGB24, RGB16, and the like to implement a unified format. In this way, a picture storage resource of the electronic device can be saved without affecting a display effect. This reduces time required by the electronic device to load a picture resource from a flash to an internal memory, and improves user experience.

Figure 3:
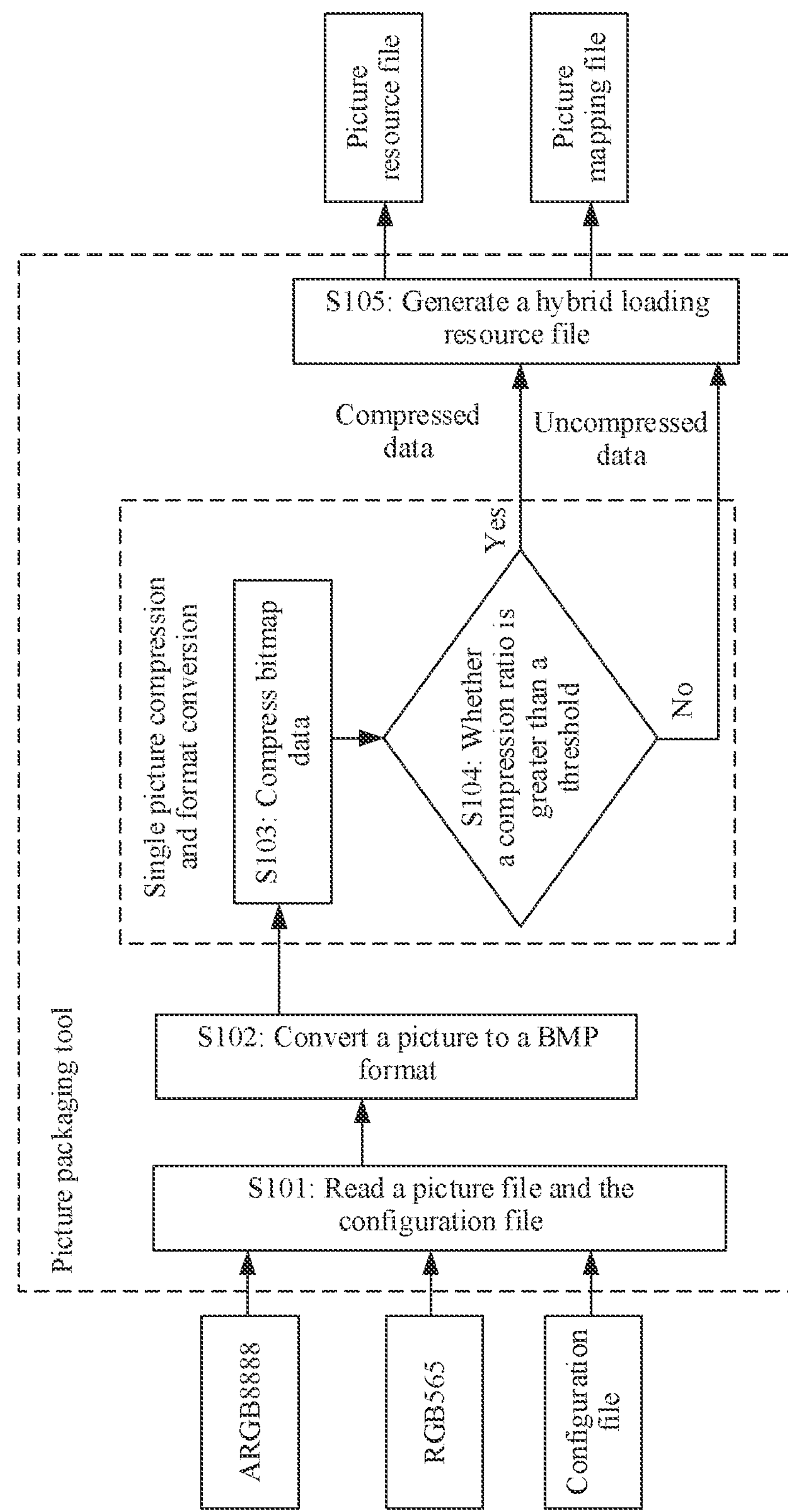
FIG. 3 shows a format conversion method according to an embodiment of this application.

With reference to the picture encoding format in FIG. 2, and based on the diagram of the hardware architecture shown in FIG. 1, this application provides a format conversion method below, to convert picture files in different source formats into picture files in the picture encoding format in FIG. 2. FIG. 3 is a schematic flowchart of a format conversion method.

S101. Read a picture file and a configuration file.

The electronic device reads an input picture file and configuration file. The picture file may include one or more pictures, and formats of the one or more pictures may be a plurality of different formats, for example, the ARGB8888 format, the RGB565 format, and the RGB555 format. If a picture use scenario requires transparency or delicate gradient color transition, a picture in the ARGB8888 format may be used. In other scenarios, a picture in the RGB565/RGB555 may be used. The configuration file stores a rule for format conversion on the picture file. The rule includes the foregoing picture encoding format. Pictures in different formats may be encoded into a unified format by using the rule.

If a format of a picture is ARGB8888, a control attribute of a control bit in the picture encoding format indicates that a transparent channel is supported, and a color format is RGB888. If a format of a picture is RGB565, a control attribute of a control bit in the picture encoding format indicates that the transparent channel is not supported, and a color format is RGB565.

In this embodiment of this application, a picture in the picture file may be referred to as a source file of the first picture file, a format of the source file of the first picture file may be referred to as a source format of the first picture file, and a field describing the source format of the first picture file may be referred to as a format field.

S102. Convert a picture to the BMP format.

After reading the picture file and the configuration file, the electronic device converts one or more pictures in the picture file to the BMP format. The BMP format is an RGB bitmap in an uncompressed format. For example, a picture read by the electronic device is a PNG picture, bitmap data of the picture needs to be decompressed, and the bitmap data of the PNG picture needs to be described in an RGB manner.

S103. Compress bitmap data.

For each picture, after converting the picture into the standard data format, the electronic device compresses bitmap data of the picture. The compression algorithm may be the algorithm of merging consecutive identical pixels. The compression algorithm may alternatively include other types of algorithms. This is not limited in this embodiment of this application.

S104. Determine whether a compression ratio is greater than a threshold.

After compressing the bitmap data of each picture, the electronic device determines whether a compression ratio of the picture is greater than the threshold. If the compression ratio is greater than the threshold, the picture is compressed based on the algorithm of merging consecutive identical pixels, a compression algorithm field of the picture indicates that compression is performed by using the algorithm of merging consecutive identical pixels, and data after the compression is filled into a bitmap data field in the picture encoding format. If the picture uses a large quantity of gradient colors, resulting in an excessively low compression ratio, data expansion, negative compression, or a compression ratio less than the threshold, the bitmap data of the picture is directly filled into the bitmap data field in the picture encoding format without compression. Then, the compression algorithm field indicates that compression is not performed.

The compression ratio of the picture is ratio of a size of space occupied by the picture before the compression to a size of space occupied by the picture after the compression. The threshold may be evaluated comprehensively based on a computing capability of the MCU, the reading speed of the file system, and read and write performance of the PSRAM. The process of determining whether the compression ratio is greater than or equal to the threshold may avoid a situation in which the picture file occupies more storage resources of the electronic device after the compression, and optimize a processing effect on the picture.

S105. Generate a hybrid loading resource file.

After the compression and the determination are completed for a single picture, the electronic device converts the picture to the picture encoding format based on the rule configured in the configuration file. After format conversion is completed for all the pictures in the picture file, the electronic device generates a resource mapping table of the pictures. In the resource mapping table, the pictures are encoded based on a rule of "Application ID_Resource ID", for example, A100_001, A100_002, and A100_003. When the electronic device needs to use a picture, a location of the picture in the resource file may be directly retrieved by using an application ID and a resource ID. The hybrid loading resource file includes the resource file of the pictures and the resource mapping table of the pictures. The resource file of the pictures may be stored in the flash of the electronic device, and the resource mapping table of the pictures may be stored in the ROM of the electronic device.

In this application, after the electronic device converts the source file of the first picture file to the picture encoding format, the source file of the first picture file may be referred to as a first picture file.

The foregoing procedure is a format conversion process completed for a picture based on the picture encoding format shown in FIG. 2. According to the foregoing procedure, the electronic device may read pictures in different formats, and perform format conversion on the pictures in different formats, to implement a unified format. This saves a picture storage resource in the electronic device, and reduces a picture storage size without affecting a display effect, thereby improving a picture loading speed.

Figure 4:
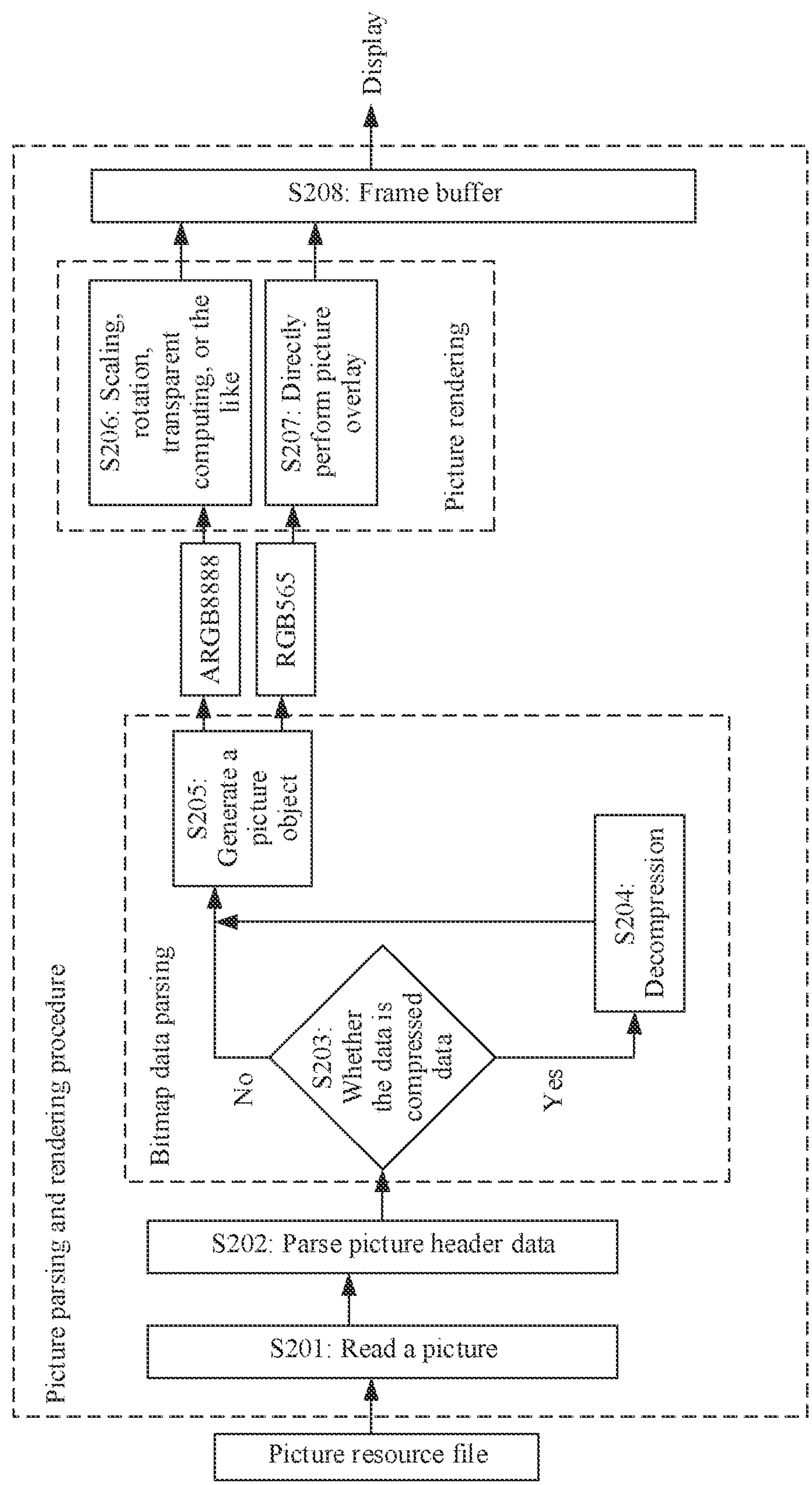
FIG. 4 shows a picture loading method according to an embodiment of this application.

Correspondingly, for the picture format conversion method provided in FIG. 3, FIG. 4 describes a picture loading method. When the electronic device is powered on or a display page is switched, a picture needs to be decompressed, and then loaded to a display of the electronic device. Next, a method embodiment of FIG. 4 is described in detail.

S201. Read a picture.

The electronic device reads the picture to the internal memory. A resource file of the picture is stored in the flash of the electronic device. When the electronic device is powered on or a display page is switched, the MCU reads a picture resource from the resource file of the flash by searching the resource mapping table of the ROM and using the file system. The picture is encoded based on the rule of "application ID_resource ID". When the electronic device needs to use the picture, a location of the picture in the resource file may be directly retrieved by using an application ID and a resource ID.

For example, when the electronic device needs to use pictures whose codes are A100_001, A100_002, and A100_003, the electronic device searches the resource mapping table for locations of the pictures whose codes are A100_001, A100_002, and A100_003 in the resource file, and reads, from the resource file after obtaining the locations, picture resources corresponding to the locations.

In this application, the electronic device reads the picture into the internal memory, and the picture may be referred to as a first picture file.

S202. Parse picture header data.

After reading the picture into the internal memory, the electronic device parses a file header based on the picture encoding format provided in FIG. 2. Information obtained by parsing the file header includes a control bit (whether the transparent channel is supported), a color format, and a compression algorithm.

In this application, the control bit and the color format of the first picture file may be referred to as a formal field of the first picture file. The format field of the first picture file describes a source format of the first picture file.

S203. Determine whether bitmap data is compressed data.

After parsing the header data of the picture, the electronic device determines whether bitmap data in the picture is compressed data. If the compression algorithm field in the header of the picture file indicates that the algorithm of merging consecutive pixels is used, the bitmap data in the picture is compressed data, and step S204 is performed. If the compression algorithm field of the picture file header indicates that compression is not performed, the bitmap data in the picture is not compressed data, and step S205 is performed.

In this application, the bitmap data may be referred to as a data field.

S204. Decompress.

If the compression algorithm field in the header of the picture file indicates that the algorithm of merging consecutive pixels is used, the bitmap data in the picture is compressed data, and the electronic device performs pixel decompression on the bitmap data of the picture. For example, 13 consecutive identical red pixels may be merged and represented as "F Red 13". F is a compression flag, Red is a color, and 13 is a quantity of colors. During decompression, after the compression flag F is encountered, the subsequent 13 consecutive colors are decompressed.

S205. Generate a picture object.

If the compression algorithm field in the header of the picture file indicates that compression is not performed, the bitmap data of the picture does not need to be decompressed, and a picture object is directly generated. If the compression algorithm field of the picture header indicates that compression is performed, a picture object is generated after the bitmap data of the picture is decompressed.

After generating picture objects, the electronic device distinguishes the picture objects based on the control hit and the color format, and renders picture objects in different formats respectively. In this embodiment of this application, two different rendering manners are provided for example. For a picture object (for example, a picture in the ARGB8888 format) with the transparent channel, step S206 is performed. For a picture object without the transparent channel (for example, a picture in the RGB565 format), step S207 is performed.

In this application, a format of a picture with the transparent channel may be referred to as a first format (for example, the ARGB8888 format), and a format of a picture without the transparent channel may be referred to as a second formal (for example, the RGB565 format).

S206. Scaling, rotation, transparent computing, or the like.

The electronic device performs scaling, rotation, transparent computing, or the like on the picture in the ARGB8888 format. Because the picture in the ARGB8888 format has the transparent channel, rendering operations such as rotation, scaling, and transparent computing may be supported. The scaling operation is used to control a size or a ratio of a picture to be displayed on the display, the rotation operation is used to control a rotation effect of a picture to be displayed on the display, and the transparency computing is used to control transparency of a picture to be displayed on the display.

For example, a display interface of a watch face may include pictures such as a watch face background, an hour hand, a minute hand, and a second hand. The pictures of the hour hand, the minute hand, and the second hand require transparency and rotation actions, and therefore, the pictures of the hour hand, the minute hand, and the second hand are pictures in the ARGB8888 format. The electronic device performs rotation and transparent computing for the pictures of the hour hand, the minute hand, and the second hand respectively, so that the hour hand, the minute hand, and the second hand can rotate, and the pictures of the hour hand, the minute hand, and the second hand do not block the watch face background.

In some possible embodiments, the electronic device renders picture objects in different formats respectively, and determines, based on configuration information of the electronic device, rendering operations corresponding to the pictures. The configuration information includes a size of the display and a display configuration of the display. The electronic device determines a display size or ratio of the picture by using the size of the display, and performs corresponding display matching on the picture by using the display configuration (for example, a display format) of the display, so that the picture can be displayed on the display through rendering.

In some possible embodiments, the electronic device renders picture objects in different formats respectively, and determines, based on a second picture file, a rendering operation corresponding to the first picture file. When the second picture file is a background picture, for different background pictures, the electronic device may perform different rendering operations on the first picture file. Specifically, the electronic device may overlay and display the first picture file on the second picture file, or the electronic device may overlay and display the first picture file on the second picture file based on different transparency, or the electronic device may overlay and display the first picture file on different positions of the second picture file, or the electronic device may overlay and display the first picture file on the second picture file different sizes or ratios.

An operation manner and step of the rendering operation are not limited in this application.

S207. Directly perform picture overlay.

The electronic device directly performs picture overlay on the picture in the RGB565 format. That is, when the RGB565 picture is used as a background, the picture does not block any element. When the RGB565 picture is used as a foreground, the picture blocks all elements below such as a picture and a text.

S208. Frame buffer.

After rendering the picture, the electronic device displays the picture on the display by using the frame buffer module. The electronic device completes loading of the picture.

The foregoing procedure is a picture loading procedure based on the picture encoding format in FIG. 2, loading may be implemented as required based on an intended purpose, and hybrid loading of a plurality of different picture display effects is supported. The picture encoding format provided in this application supports a plurality of pictures in different formats, thereby reducing a picture storage size, and improving a picture loading speed.

In some possible embodiments, labor investment for picture evaluation may be reduced by reducing supported picture formats. For example, only the RGB565 and ARGB8888 picture formats are used. In scenarios in which transparency is required or gradient colors are obvious, a picture in the ARGB8888 format is used. In other scenarios, a picture in the RGB565 format is used.

In conclusion, embodiments shown in FIG. 2 to FIG. 4 provide a picture encoding format, and format conversion and picture loading are performed on a picture based on the encoding format. Hybrid rendering of pictures in different formats is supported, so that the electronic device can optimize picture storage, a size of a loaded picture, and a picture loading speed. Embodiments of this application provide a hybrid rendering manner for several formats such as RGB565/ARGB8888, which can cover most optimization requirements, and improve user experience. The foregoing hybrid rendering manner for RGB565/ARGB8888 is merely an example manner, and format types and quantities of pictures supported by the electronic device are not limited in this application.

However, RGB565/RGB888 does not support transparency, and blockage may occur in some scenarios. Therefore, the RGB565/RGB888 format is limited sometimes in actual applications.

In view of this, an embodiment of this application provides another picture encoding format, to resolve the problem that the RGB565/RGB888 format does not support transparent computing.

FIG. 5 shows another example picture encoding format according to an embodiment of this application. The picture encoding format includes a control bit, a color format, a compression algorithm, a picture width, a picture height, a transparent color, reserved, a color table, and bitmap data.

A control attribute of the control hit includes whether a transparent channel alpha is supported. For example, if the picture is in the ARGB8888 format, the control attribute indicates that the transparent channel is supported.

The control attribute of the control bit further includes whether the transparent color is used. The transparent color is a preset color value representing transparency. If the picture uses the color value representing transparency, the MCU considers the color value as transparent for processing when parsing and rendering the picture. If the picture is in the RGB565 or RGB888 format, the transparent color may be set to perform transparency processing on a color.

The control attribute of the control bit further includes whether a palette is used. With the palette, the picture may be compressed by representing a pixel color by using an index number.

For example, there are 4 control bits. 1 bit is used to indicate whether the transparent channel alpha is supported, and 1 indicates that the transparent channel is supported. 1 bit is used to indicate whether the transparent color is used, and 1 indicates that a transparent color value is used. 1 bit is used to indicate whether the palette is used, and 1 indicates that the palette is used. In addition, 1 bit is reserved.

The color format is a color format of the picture, including the RGB888 format, the ARGB888 format, the RGB565/555 format, and the like. For example, 0x888 may be used to represent the RGB888 color format. If the control attribute of the control bit indicates that the transparent channel is supported, the color format is the RGB888 format. If the control attribute of the control bit indicates that the transparent channel is not supported, the color format is the RGB888 format. 0x565 may be used to represent the RGB565 format, and 0x555 may be used to represent the RGB555 format.

The control bit and the color format may be used in combination to describe a picture format. For example, 0x8888=(1000B<<12)+0x0888 indicates an ARGB8888 32-bit picture with the transparent channel. 0x4888=(0100B<<12)+0x0888 indicates an RGB888 24-bit picture with the transparent color. 0xA888=(1010B<<12)+0x0888 indicates an ARGB8888 32-bit picture with the transparent channel and compressed by using the palette. 0x6888=(0110B<<12)+0x0888 indicates an RGB888 24-bit picture with the transparent color and compressed by using the palette.

In this application, a field indicating a format of a picture may be referred to as a format field. For example, if the control attribute of the control bit and the color format jointly indicate that the picture is in the ARGB888 format, a format field of the picture includes the control bit and the color format.

The compression algorithm is, for example, an algorithm of merging consecutive identical pixels. When a compression ratio does not reach a threshold, compression may be not selected.

For the picture width/picture height, Width*Height determines a quantity of pixels in the bitmap data.

The transparent color is a preset color value representing transparency, by which a partial area in RGB565/RGB888 may be fully transparently displayed. In a decompression phase, if the control attribute of the control bit indicates that there is no transparent color, this field is not processed. In a possible implementation, two or more transparent color values may be set for the transparent color.

The palette is used to store a correspondence between a color value and a color index. In the decompression stage, if the control attribute of the control bit indicates that the palette is used, the palette is parsed. If the control property of the control bit indicates that the palette is not used, the palette is not parsed.

Reserved ensures that headers of picture formats are aligned in bytes.

The bitmap data is pixel data used to display an actual image. For example, one pixel in ARGB8888 occupies 4 bytes. One pixel in RGB888 occupies 3 bytes. One pixel in RGB565 occupies 2 bytes. One pixel of a picture in the palette format occupies 1 byte. In this application, the bitmap data may be referred to as a data field.

In the foregoing provided picture encoding format, pictures in different formats may be described by using the control bit field and the color format field. That is, with the picture encoding format, different types of picture formats may be encoded to implement a unified format, to improve storage and loading efficiency of the pictures. The picture encoding format in this embodiment further includes the transparent color and palette fields. With the transparent color, for a picture format that does not support the transparent channel, some colors can have a transparent effect on the display, thereby expanding a use range of the picture format that does not support the transparent channel, and further saving a storage resource of the electronic device. With the palette, a picture size may be compressed, to save a storage resource of the electronic device.

A sequence, lengths, names, and division of the fields in the picture encoding format are not limited in this application.

With the picture encoding format, in this application, different source formats may be used for different pictures respectively based on features of the pictures, and then format conversion is performed on pictures in different source formats, to implement a unified format. It is unnecessary to use a same format as source formats of all pictures in the electronic device for format unification. In this application, the transparent color may be set for the picture format that does not support the transparent channel, to increase a frequency of using the picture format that does not support the transparent channel. For example, the transparent color is set for the RGB565/RGB888 picture format, so that the ARGB8888 format is not required, thereby saving a picture storage resource.

Figure 6:
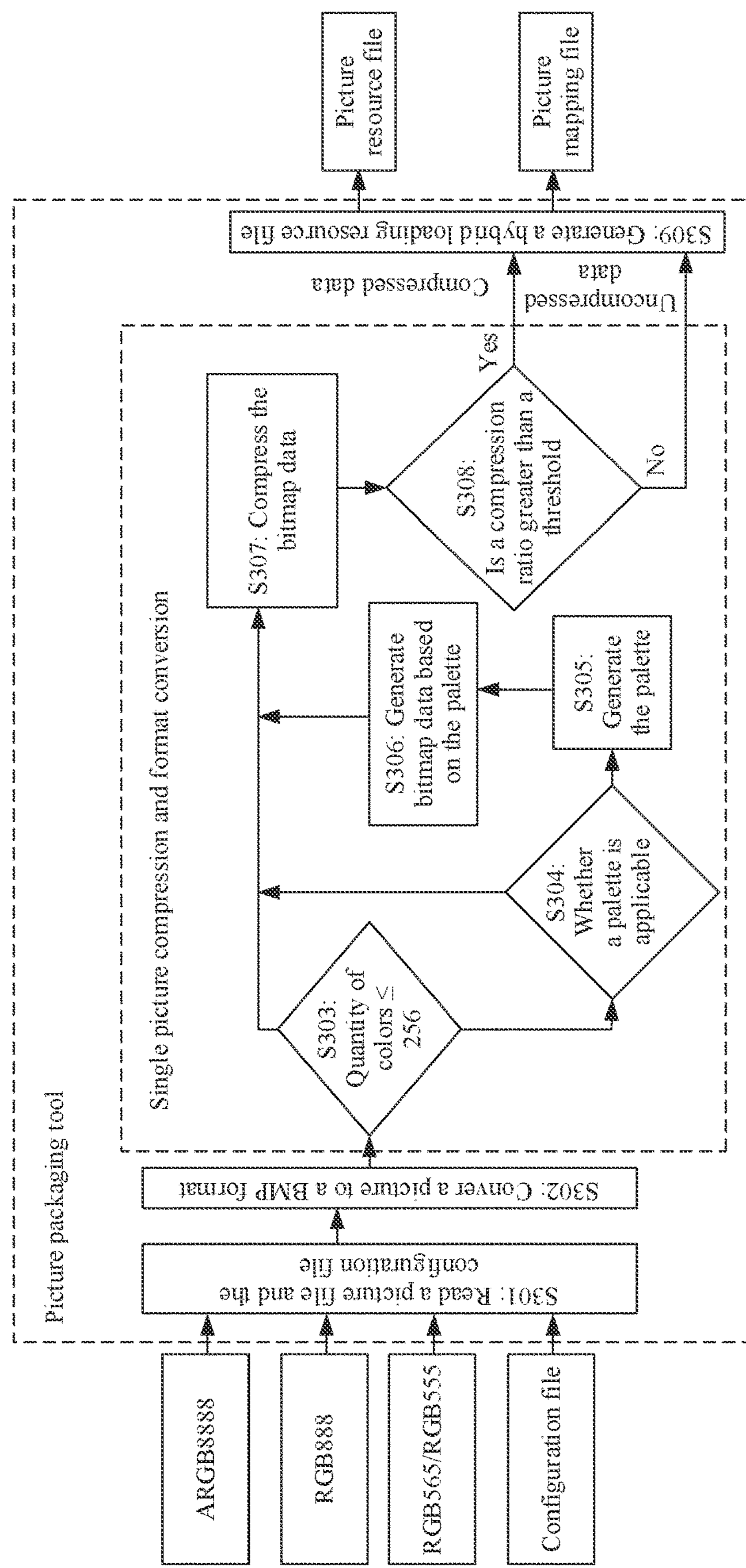
FIG. 6 shows another format conversion method according to an embodiment of this application.

With reference to the picture encoding format in FIG. 5, and based on the diagram of the hardware architecture shown in FIG. 1, this application provides another format conversion method below, to convert picture files in different source formats into picture files in the picture encoding format in FIG. 5. FIG. 6 is a schematic flowchart of another format conversion method.

S301. Read a picture file and a configuration file.

The electronic device reads an input picture file and configuration file. The picture file may include one or more pictures, and formats of the one or more pictures may be a plurality of different formats, for example, the ARGB8888 format, the RGB888 format, and the RGB565/RGB555 format. If a picture use scenario requires transparency or delicate gradient color transition, a picture in the ARGB8888 format may be used. In other scenarios, a picture in the RGB565/RGB555 may be used. The configuration file stores a rule for format conversion on the picture file. The rule includes the foregoing picture encoding format. Pictures in different formats may be encoded into a unified format by using the rule.

The configuration file further includes a transparent color value of the picture file. If a transparent color value of a picture is set in the configuration file, a control attribute of a control bit in an encoding format of the picture is set to indicate that the transparent color value is used, and the transparent color value is directly filled into a transparent color field of the picture encoding format. When rendering the picture, the MCU considers the transparent color value as transparent for processing. If no transparent color value of the picture is set in the configuration file, the control attribute of the control bit in the encoding format of the picture is set to indicate that no transparent color value is used, and the transparent color field in the encoding format of the picture is invalid. The MCU does not process the transparent color field when rendering the picture.

In this embodiment of this application, a picture in the picture file may be referred to as a source file of the first picture file, a format of the source file of the first picture file may be referred to as a source format of the first picture file, and a field describing the source format of the first picture file may be referred to as a format field.

S302. Convert a picture to the BMP format.

After reading the picture file and the configuration file, the electronic device converts one or more pictures in the picture file to the BMP format. The BMP format is an RGB bitmap in an uncompressed format. For example, a picture read by the electronic device is a PNG picture, bitmap data of the picture needs to be decompressed, and the bitmap data of the PNG picture needs to be described in an RGB manner.

S303. Determine whether a color quantity of the picture is less than or equal to 256.

After converting the picture to the standard picture format, the electronic device determines whether a quantity of all different colors included in the picture is less than or equal to 256. The palette can store only a limited quantity of colors, usually, 256 colors. Therefore, if it is expected to compress the picture by using the palette, determination needs to be performed on the color quantity of the picture. If the color quantity is less than or equal to 256, step S304 is performed. If the color quantity is not less than or equal to 256, step S307 is performed.

S304. Determine whether the palette is applicable.

If the quantity of all the different colors included in the picture is less than or equal to 256, whether the palette is applicable to the picture is further determined. The palette introduces extra overheads of "Color quantity*256/8 bytes". Therefore, if a picture is excessively small, the extra overheads are greater than compressed data, and palette compression is not applicable. A size of a picture before compression is (Picture width*Picture height*Color quantity/8), and a size of the picture after compression by the palette is (Picture width*Picture height+Color quantity*256/8). If the size of the picture after the compression is less than the size of the picture before the compression, palette compression is applicable to the picture. If the size of the picture after the compression is greater than or equal to the size of the picture before the compression, palette compression is not applicable to the picture.

If the palette is applicable, step S305 is performed, and a palette field of the picture encoding format indicates that the palette is used. If the palette is not applicable, step S307 is performed, and the palette field of the picture encoding format indicates that the palette is not used.

S305. Generate the palette.

If palette format compression is applicable to a picture size, the palette is generated, that is, the overheads of "Color quantity*256/8 bytes" are introduced.

S306. Generate bitmap data based on the palette.

The generating bitmap data based on the palette means representing a color by using a byte.

S307. Compress bitmap data.

For each picture, after the electronic device converts the picture to the standard data format, if a color quantity of the picture is greater than 256, bitmap data of the picture is compressed directly. If the color quantity of the picture is less than or equal to 256 but the palette is not applicable, the bitmap data of the picture is compressed directly. If new bitmap data is generated for the picture based on the palette, the new bitmap data of the picture is compressed. The compression algorithm may be the algorithm of merging consecutive identical pixels.

S308. Determine whether a compression ratio is greater than a threshold.

After compressing the bitmap data of each picture, the electronic device determines whether a compression ratio of the picture is greater than the threshold. If the compression ratio is greater than the threshold, the picture is compressed based on the algorithm of merging consecutive identical pixels, a compression algorithm field of the picture indicates that compression is performed by using the algorithm of merging consecutive identical pixels, and data after the compression is filled into a bitmap data field in the picture encoding format. If the picture uses a large quantity of gradient colors, resulting in an excessively low compression ratio, data expansion, negative compression, or a compression ratio less than the threshold, the bitmap data of the picture is directly filled into the bitmap data field in the picture encoding format without compression. Then, the compression algorithm field indicates that compression is not performed.

The compression ratio of the picture is ratio of a size of space occupied by the picture before the compression to a size of space occupied by the picture after the compression. The threshold may be evaluated comprehensively based on a computing capability of the MCU, a reading speed of the file system, and read and write performance of the PSRAM. The process of determining whether the compression ratio is greater than or equal to the threshold may avoid a situation in which the picture file occupies more storage resources of the electronic device after the compression, and optimize a processing effect on the picture.

S309. Generate a hybrid loading resource file.

After the compression and the determination are completed for a single picture, the electronic device converts the picture to the picture encoding format based on the rule configured in the configuration file. After format conversion is completed for all the pictures in the picture file, the electronic device generates a resource mapping table of the pictures. In the resource mapping table, the pictures are encoded based on a rule of "Application ID_Resource ID", for example. A100_001, A100_002, and A100_003. When the electronic device needs to use a picture, a location of the picture in the resource file may be directly retrieved by using an application ID and a resource ID. The hybrid loading resource file includes the resource tile of the pictures and the resource mapping table of the pictures. The resource file of the pictures may be stored in the flash of the electronic device, and the resource mapping table of the pictures may be stored in the ROM of the electronic device.

In this application, after the electronic device converts the source file of the first picture file to the picture encoding format, the source file of the first picture file may be referred to as a first picture file.

The foregoing procedure is a format conversion process completed for a picture based on the picture encoding format shown in FIG. 5. According to the foregoing procedure, the electronic device may read pictures in different formats, and perform format conversion on the pictures in different formats, to implement a unified format. This can save a picture storage resource in the electronic device, and reduce a picture storage size without affecting a display effect, thereby improving a picture loading speed. In addition, the transparent color field is added to the picture encoding format in this application, so that transparency processing may also be performed on some picture formats without the transparent channel. The palette format is also added to the picture encoding format in this application, so that the size of the picture can be further compressed.

Figure 7A:
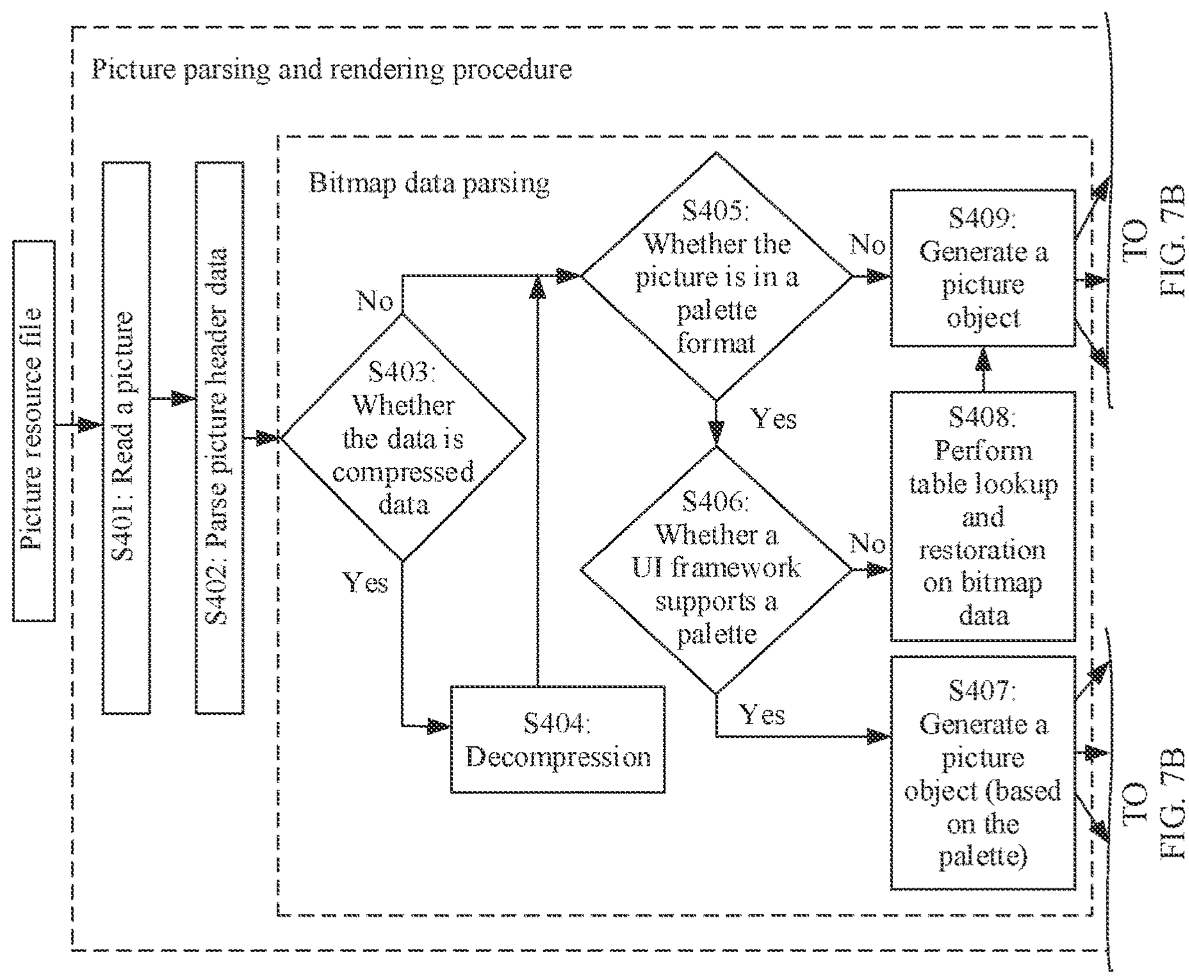
FIG. 7A and FIG. 7B show another picture loading method according to an embodiment of this application.
Figure 7B:
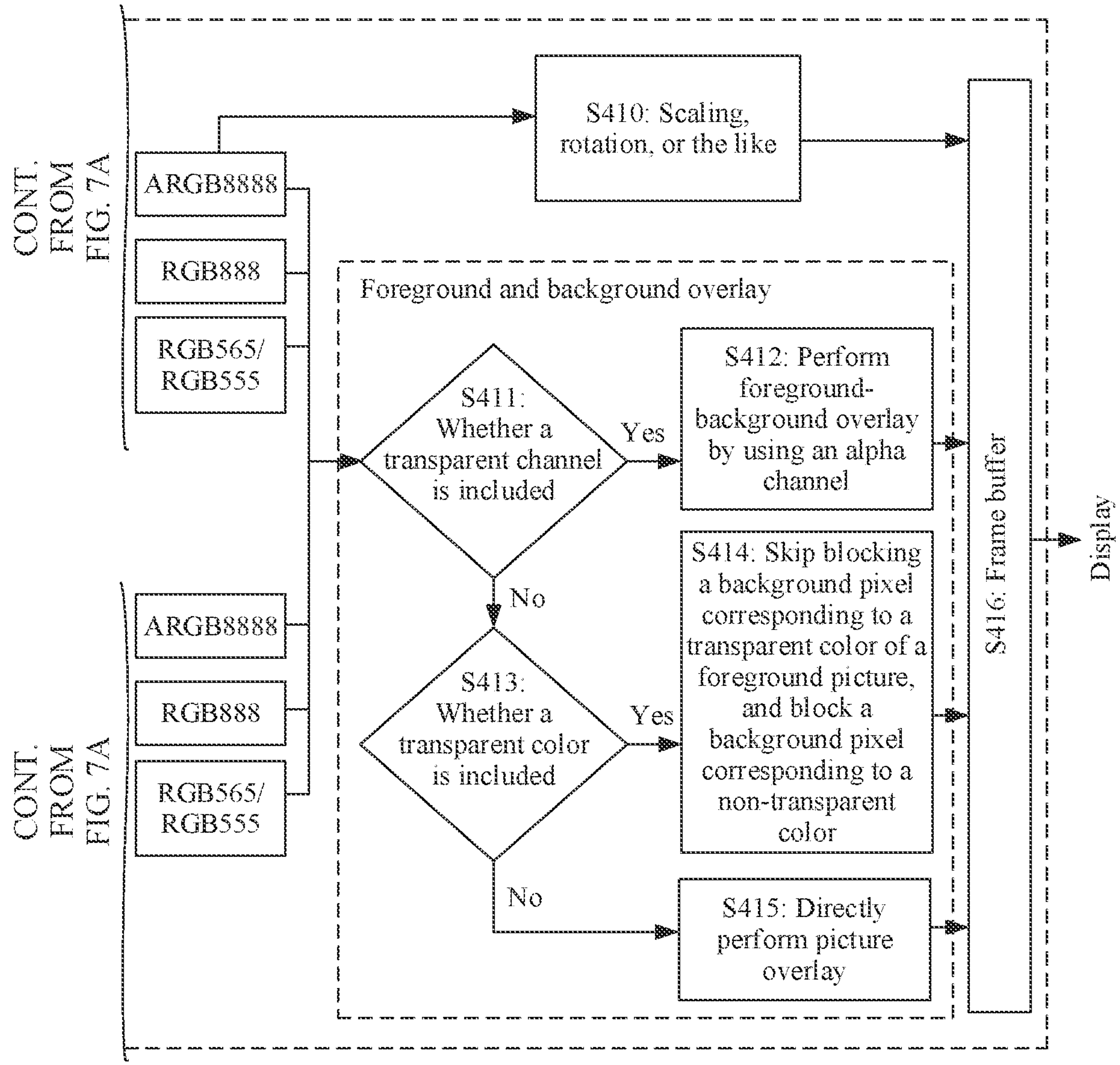

Correspondingly, for the picture format conversion method provided in FIG. 6, FIG. 7A and FIG. 7B describe another picture loading method. When the electronic device is powered on or a display page is switched, a picture needs to be decompressed, and then loaded to the display of the electronic device. Next, a method embodiment of FIG. 7A and FIG. 7B is described in detail.

S401. Read a picture.

The electronic device reads the picture to the internal memory. A resource file of the picture is stored in the flash of the electronic device. When the electronic device is powered on or a display page is switched, the MCU reads a picture resource from the resource file of the flash by searching the resource mapping table of the ROM and using the file system. The picture is encoded based on the rule of "application ID_resource ID", When the electronic device needs to use the picture, a location of the picture in the resource file may be directly retrieved by using an application ID and a resource ID.

For example, when the electronic device needs to use pictures whose codes are A100_001, A100_002, and A100_003, the electronic device searches the resource mapping table for locations of the pictures whose codes are A100_001, A100_002, and A100_003 in the resource file, and reads, from the resource file after obtaining the locations, picture resources corresponding to the locations.

In this application, the electronic device reads the picture into the internal memory, and the picture may be referred to as a first picture file.

S402. Parse picture header data.

After reading the picture into the internal memory, the electronic device parses a file header based on the picture encoding format provided in FIG. 2. Information obtained by parsing the file header includes a control bit (whether the transparent channel is supported, whether the transparent color is used, and whether the palette is used), a color format, and a compression algorithm.

In this application, the control bit and the color format of the first picture file may be referred to as a format field of the first picture file. The format field of the first picture file describes a source format of the first picture file.

S403. Determine Whether bitmap data is compressed data.

After parsing the header data of the picture, the electronic device determines whether bitmap data in the picture is compressed data. If the compression algorithm field in the header of the picture file indicates that the algorithm of merging consecutive pixels is used, the bitmap data in the picture is compressed data, and step S404 is performed. If the compression algorithm field of the picture file header indicates that compression is not performed, the bitmap data in the picture is not compressed data, and step S405 is performed.

S404. Decompress.

If the compression algorithm field in the header of the picture file indicates that the algorithm of merging consecutive pixels is used, the bitmap data in the picture is compressed data, and the electronic device performs pixel decompression on the bitmap data part of the picture. For example, 13 consecutive identical red pixels may be merged and represented as "F Red 13". F is a compression flag, Red is a color, and 13 is a quantity of colors. During decompression, after the compression flag F is encountered, the subsequent 13 consecutive colors are decompressed.

S405. Determine whether the picture is in the palette format.

If the compression algorithm field in the header of the picture file indicates that compression is not performed, the electronic device determines Whether the picture is in the palette format. Alternatively, after the electronic device decompresses the picture, the electronic device determines whether the picture is in the palette format. If the control attribute of the control bit field of the picture file header indicates that the palette is used, step S406 is performed. If the control attribute of the control bit field in the picture file header indicates that the palette is not used, step S409 is performed.

S406. Determine whether the UI framework supports the palette.

If the control attribute of the control bit field of the picture file header indicates that the palette is used, the electronic device checks whether a UI framework capability supports the palette format, that is, whether direct rendering of the picture using the palette is supported. If the palette is supported, step S407 is performed. If the palette is not supported, step S408 is performed.

S407. Generate a picture object (based on the palette).

If the UI framework capability of the electronic device supports the palette format, a picture object is generated by using bitmap data represented by the palette and the color index, that is, bitmap data in a picture format of the picture object is in the palette format.

After generating picture objects, the electronic device distinguishes the picture objects based on the control bit and the color format, and renders picture objects in different formats respectively. For example, picture objects in ARGB8888, RGB888, and RGB565/RGB555 palette formats are included.

S408. Perform table lookup and restoration on bitmap data.

If the framework capability does not support the palette format, table lookup and restoration need to be performed on the bitmap data field in the picture encoding format by using the palette. That is, the bitmap data in the palette format is restored to the source format based on a color index table. One pixel of the picture in the palette format that occupies 1 byte is restored to one pixel in the ARGB8888 format that occupies 4 bytes, one pixel in the RGB888 format that occupies 3 bytes, or one pixel in the RGB565/RGB555 format that occupies 2 bytes.

S409. Generate a picture object.

After decompressing the bitmap data of the picture, if the control attribute of the control bit field in the picture file header indicates that the palette is not used, the electronic device generates a picture object based on the picture format.

If the UI framework capability does not support the palette format, after performing table lookup and restoration on the bitmap data field in the picture encoding format, the electronic device generates a picture object based on the picture format.

After generating picture objects (including the pictures in steps S407 and S409), the electronic device distinguishes the picture objects based on the control bit and the color format, and renders picture objects in different formats respectively. In this embodiment of this application, three rendering manners are provided for example. For a picture object with the transparent channel, steps S410 and S412 are performed. For a picture object without the transparent channel but the transparent color, step S414 is performed. For a picture object without the transparent channel or the transparent color, step S415 is performed.

In this application, a format of a picture with the transparent channel may be referred to as a first format, a format of a picture without the transparent channel may be referred to as a second format, and a format of a picture without the transparent channel but the transparent color may be referred to as a third format.

S410. Scaling, rotation computing, or the like.

After generating the picture object, the electronic device performs scaling, rotation computing, or the like on the picture in the ARGB8888 format. The picture in the ARGB8888 format supports rendering operations such as rotation and scaling. The scaling operation is used to control a size or a ratio of a picture to be displayed on the display, and the rotation operation is used to control a rotation effect of a picture to be displayed on the display.

In some possible embodiments, the electronic device renders picture objects in different formats respectively, and determines, based on configuration information of the electronic device, rendering operations corresponding to the pictures. The configuration information includes a size of the display and a display configuration of the display. The electronic device determines a display size or ratio of the picture by using the size of the display, and performs corresponding display matching on the picture by using the display configuration (for example, a display format) of the display, so that the picture can be displayed on the display through rendering.

For example, a display interface of a watch face may include pictures such as a watch face background, an hour hand, a minute hand, a second hand, and a weather icon. The pictures of the hour hand, the minute hand, and the second hand require a rotation action, and therefore, the pictures of the hour hand, the minute hand, and the second hand are pictures in the ARGB8888 format. The electronic device performs rotation computing for the pictures of the hour hand, the minute hand, and the second hand respectively, so that the hour hand, the minute hand, and the second hand can rotate. An operation manner and step of the rendering operation are not limited in this application.

S411. Determine whether the transparent channel is included.

After the electronic device generates the picture object, the electronic device determines whether the picture object includes the transparent channel. If the control attribute of the control bit field in the picture file header indicates that the transparent channel is included, step S412 is performed. If the control attribute of the control bit field in the picture file header indicates that the transparent channel is not included, step S413 is performed.

S412, Perform foreground-background overlay by using the alpha channel.

If the control attribute of the control bit field in the picture file header indicates that the transparent channel is included, foreground-background overlay computing is performed by using the alpha channel.

In some possible embodiments, the electronic device renders picture objects in different formats respectively, and determines, based on a second picture file, rendering operations corresponding to the first picture file. When the second picture file is a background picture, for different background pictures, the electronic device may perform different rendering operations on the first picture file. Specifically, the electronic device may overlay and display the first picture file on the second picture file, or the electronic device may overlay and display the first picture file on the second picture file based on different transparency, or the electronic device may overlay and display the first picture file on different positions of the second picture file, or the electronic device may overlay and display the first picture file on the second picture file in different sizes or ratios.

S413. Determine whether the transparent color is included.

If the control attribute of the control bit field in the picture file header indicates that the transparent channel is not included, the electronic device further determines whether the picture object includes the transparent color. If the transparent color is included, step S414 is performed. If the transparent color is not included, step S415 is performed.

S414. Skip blocking a background pixel corresponding to a transparent color of a foreground picture, and block a background pixel corresponding to a non-transparent color.

If the control attribute of the control bit field in the picture file header indicates that the transparent color is included, the transparent color value in the picture is processed as transparent, and an element such as a background picture or text is not blocked. A background picture corresponding to a non-transparent color in the picture is still blocked.

S415. Directly perform picture overlay.

If the control attribute of the control bit field in the picture file header indicates that neither the transparent channel nor the transparent color is included, the picture is displayed on another picture, that is, picture overlay is directly performed, and the picture blocks all elements such as a background picture and text.

S416. Frame buffer.

After rendering the picture, the electronic device displays the picture on the display by using the frame buffer module. The electronic device completes loading of the picture.

The foregoing procedure is a picture loading procedure based on the picture encoding format in FIG. 5, loading may be implemented as required based on an intended purpose, and. hybrid loading of a plurality of different picture display effects is supported. The picture encoding format provided in this application supports a plurality of pictures in different formats, thereby reducing a picture storage size, and improving a picture loading speed. With the transparent color field, a transparent function can be implemented for pictures in the RGB888 and RGB565 formats, thereby greatly improving a frequency of using the pictures in the RGB888 and RGB565 formats, and saving a picture storage resource. With the palette field, a size of the picture file is further compressed, thereby saving storage space of the electronic device.

In some possible embodiments, labor investment for picture evaluation may be reduced by reducing supported picture formats. For example, only RGB565 and ARGB8888 picture formats are used. In scenarios in which transparency is required or gradient colors are obvious, a picture in the ARGB8888 format is used. In other scenarios, a picture in the RGB565 format is used. A plurality of transparent colors may be set to expand use scenarios of pictures in the RGB565 format, thereby saving a picture storage resource.

In conclusion, embodiments shown in FIG. 5 to FIG. 7B provide a picture encoding format, and formal conversion and picture loading are performed on a picture based on the encoding formal. Hybrid rendering of pictures in different formats is supported, so that the electronic device can optimize picture storage, a size of a loaded picture, and a picture loading speed. The transparent color field is added to the picture encoding format, so that a transparent function can be implemented for the RGB888 and RGB565 formats without the transparent channel, thereby greatly improving a frequency of using pictures in the RGB888 and RGB565 formats in actual applications, saving a picture storage resource, and optimizing flash performance.

The foregoing embodiments provide picture format conversion and picture loading methods. The following describes an application scenario of an embodiment of this application for a watch face store of a sports watch.

FIG. 8 shows a unified installation data package format of a watch face store. An application on a sports watch is used as an example. FIG. 8 shows an example watch face data package format according to an embodiment of this application. The watch face data package format includes a resource packing tool version number, a watch face configuration size, a picture mapping table size, a reserved field, a watch face configuration, a picture resource mapping table, and a picture resource.

The resource packing tool version number is used to indicate a version of a resource packing tool. After a control capability of the watch face store is enhanced, the resource packing tool version number needs to be upgraded. The resource packing tool version number also needs to be upgraded for the watch face store to support hybrid loading of pictures. The resource packing tool version number is updated to prevent a failure to normally display, on a watch with an earlier version, a later-version watch face loaded with pictures in a hybrid manner.

The watch face configuration size is used to describe a length of a watch face configuration field. The configuration size varies with watch face elements of different vendors.

The picture mapping table size is used to describe a size of a picture mapping table used in a watch face. Because watch faces of different vendors use different quantities of pictures, different mapping entries are required for different quantities of picture resources.

The watch face resource size is used to describe a total size of picture resources used by a watch face. Because watch faces of different vendors use different quantities of pictures with different content, the total size of picture resources varies.

The watch face configuration mainly stores watch face related information such as a control parameter, coordinates, a data connection, and a behavior description.

The picture resource mapping table describes a structure of a picture resource and an attribute of each picture. Each mapping entry includes two fields: an offset and a size. A location of a picture in a picture resource segment may be found by using the offset, and the picture may completely read to a buffer of a PSRAM by using the size.

The picture resource is used to store actual picture data. A format of the picture data may be the picture encoding format provided in FIG. 2 or FIG. 5.

For example, the sports watch obtains a picture file, where the picture file includes a watch face picture required by the sports watch; compresses the picture file in the compression manner described in FIG. 3 or FIG. 6; and fills a compressed picture file into the picture resource. When the sports watch is powered on, a home screen of the watch face needs to be displayed on a display, and an MCU in the watch face reads a picture resource by searching a resource mapping table of a ROM and using a file system. The home screen of the watch face includes a plurality of pictures such as a background picture, an hour hand picture, a minute hand picture, a second hand picture, a weather icon picture, a temperature icon picture, and a progress bar for a heart rate\step count. After reading required picture resources, the electronic device decompresses and renders the plurality of picture resources respectively in the manner described in FIG. 4 or FIG. 7A and FIG. 7B, and finally displays the plurality of picture resources on the display of the sports watch.

The electronic device in embodiments of this application may alternatively be a smart band or a smart watch. For an installation data package format of the smart wristband and the smartwatch, refer to the format shown in FIG. 8.

Figure 9:
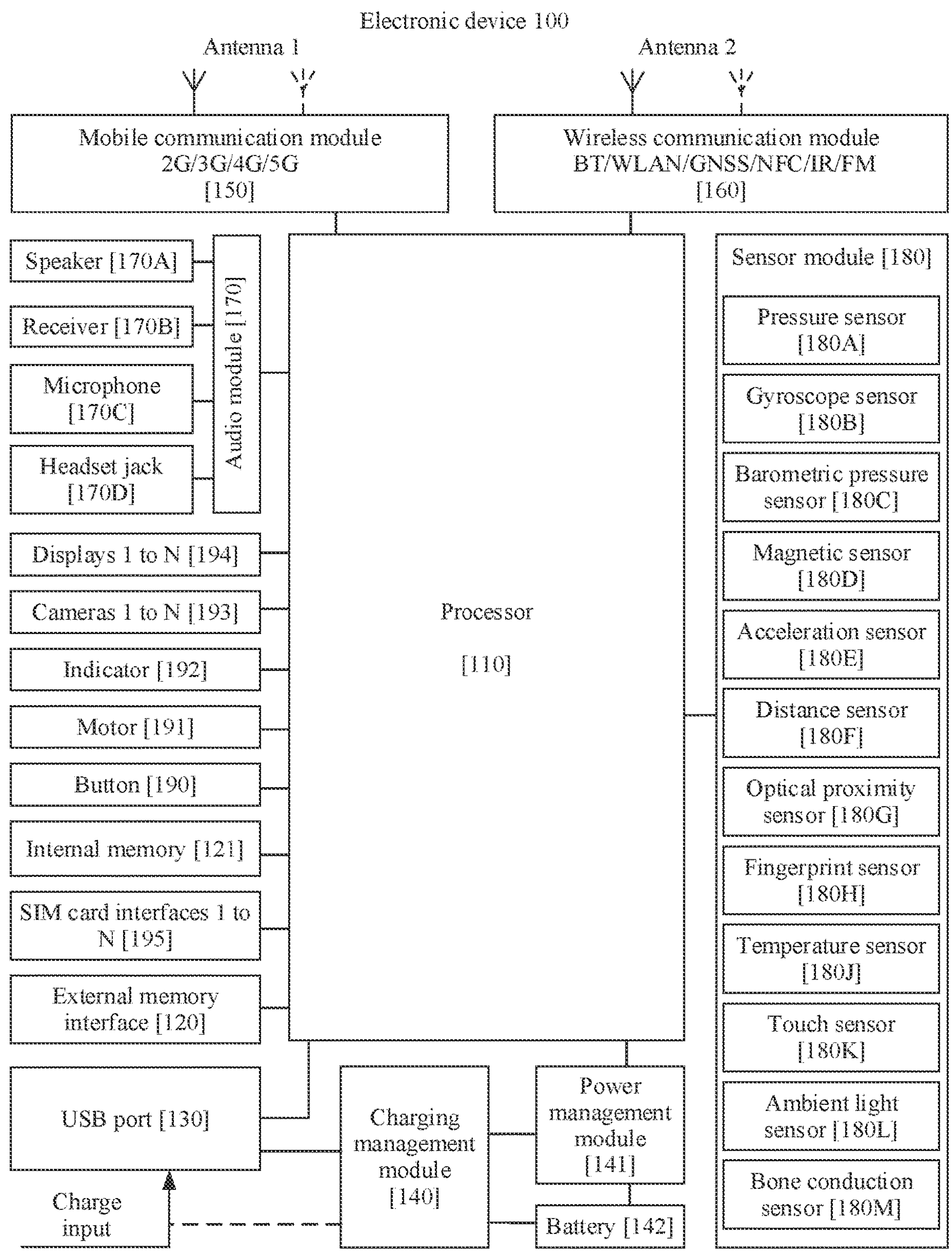
FIG. 9 is a schematic diagram of a structure of an electronic device according to an embodiment of this application.

For ease of understanding embodiments of this application, an electronic device 100 shown in FIG. 9 is used as an example to describe an electronic device to which embodiments of this application are applicable.

FIG. 9 is a schematic diagram of a structure of an example electronic device 100 according to an embodiment of this application.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors. In some embodiments, the electronic device 100 may alternatively include one or more processors 110.

The controller may be a nerve center and a command center of the electronic device 100. The controller may generate an operation control signal based on an instruction operation code and a time sequence signal, to complete control of instruction fetching and instruction execution.

A memory may be disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, and reduces waiting time of the processor 110, thereby improving efficiency of the electronic device 100.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) port, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be used for audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually used to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be used to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI interface, to implement a display function of the electronic device 100.

The GPIO interface may be configured by using software. The GPIO interface may be configured as a control signal, or may be configured as a data signal. In some embodiments, the GPIO interface may be used to connect the processor 110 to the camera 193, the display 194, the wireless communication module 160, the audio module 170, the sensor module 180, or the like. The GPIO interface may be configured as the I2C interface, the I2S interface, the UART interface, the MIPI interface, or the like.

The USB port 130 is a port that conforms to a USB standard specification, and may be specifically a mini USB port, a micro USB port, a USB Type C port, or the like. The USB port 130 may be used to connect to a charger to charge the electronic device 100, or may be configured to transmit data between the electronic device 100 and a peripheral device, or may be used to connect to a headset, to play audio by using the headset. The port may be used to connect to another electronic device such as an AR device.

It may be understood that an interface connection relationship between the modules that is shown in this embodiment of the present disclosure is merely an example for description, and does not constitute a limitation on a structure of the electronic device 100. In some other embodiments, the electronic device 100 may alternatively use an interface connection manner different from that in the foregoing embodiment, or use a combination of a plurality of interface connection manners.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a wireless communication solution that is applied to the electronic device 100 and that includes 2G/3G/4G/5G and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, and the like), or displays an image or a video on the display 194. In some embodiments, the modern processor may be an independent component. In some other embodiments, the modem processor may be independent of the processor 110, and is disposed in the same device as the mobile communication module 150 or another functional module.

The wireless communication module 160 may provide a wireless communication solution that is applied to the electronic device 100, and that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2. For example, the wireless communication module 160 may include a Bluetooth module and a Wi-Fi module.

The electronic device 100 may implement a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute instructions to generate or change display information.

The display 194 is configured to display an image, a video, or the like. The display 194 includes a display panel. The display panel may be a liquid crystal display (liquid crystal display, LCD), an organic light-emitting diode (oceanic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to: compress or decompress a digital video. The electronic device 100 may support one or more types of video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the electronic device 100, for example, image recognition, facial recognition, speech recognition, and text understanding, may be implemented through the NPU.

The external memory interface 120 may be used to connect to an external storage card, for example, a micro SD card, to extend a storage capability of the electronic device 100. The external storage card communicates with the processor 110 through the external memory interface 120, to implement a data storage function. For example, data such as music, photographs, and. videos is stored in the external storage card.

The internal memory 121 may be configured to store one or more computer programs. The one or more computer programs include instructions. The processor 110 may run the instructions stored in the internal memory 121, to enable the electronic device 100 to perform a data sharing method provided in some embodiments of this application, various functional applications and data processing, and the like. The internal memory 121 may include a program storage area and a data storage area. The program storage area may store an operating system. The program storage area may further store one or more applications (for example, gallery or contact) and the like. The data storage area may store data (for example, a photograph or a contact) created in a process of using the electronic device 100. In addition, the internal memory 121 may include a high-speed random access memory, and may further include a nonvolatile memory, for example, at least one magnetic disk storage device, a flash memory device, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be configured to: code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an electrical audio signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending speech information, a user may place the mouth of the user near the microphone 170C to make a sound, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and identify a sound source, to implement a directional recording function and the like.

The pressure sensor 180A is configured to sense a pressure signal, and can convert the pressure signal into an electrical signal.

The gyroscope sensor 180B may be configured to determine a motion posture of the electronic device 100.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor.

The acceleration sensor 180E may detect accelerations in various directions (usually on three axes) of the electronic device 100. When the electronic device 100 is still, a magnitude and a direction of gravity may be detected. The acceleration sensor 180E may be configured to identify a posture of the electronic device, and is used in an application such as switching between landscape mode and portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F, to implement quick focusing.

The optical proximity sensor 180G may include a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature.

The touch sensor 180K may also be referred to as a touch panel or a touch-sensitive surface. The touch sensor 180K may be disposed on the display 194, and the touch sensor 180K and the display 194 form a touchscreen. The touch sensor 180K is configured to detect a touch operation performed on or near the touch sensor. The touch sensor may transfer the detected touch operation to the application processor to determine a type of a touch event. A visual output related to the touch operation may be provided on the display 194. In some other embodiments, the touch sensor 180K may alternatively be disposed on a surface of the electronic device 100 at a location different from a location of the display 194.

The bone conduction sensor 180M may obtain a vibration signal.

The button 190 includes a power button, a volume button, and the like. The button 190 may be a mechanical button, or may be a touch button. The electronic device 100 may receive a button input, and generate a button signal input related to user settings and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, time reminding, information receiving, an alarm clock, and a game) may also correspond to different vibration feedback effects. A touch vibration feedback effect may be customized.

The indicator 192 may be an indicator light, and may be configured to indicate a charging status and a power change, or may be configured to indicate a message, a missed call, a notification, and the like.

The SIM card interface 195 is used to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible with an external storage card. The electronic device 100 interacts with a network through the SIM card, to implement functions such as calling and data communication. In some embodiments, the electronic device 100 uses an eSIM that is, an embedded SIM card. The eSIM card may be embedded into the electronic device 100, and cannot be separated from the electronic device 100.

The example electronic device 100 shown in FIG. 9 may display each user interface on the display 194. The electronic device 100 may detect, in each user interface by using the touch sensor 180K, a touch operation, for example, a tap operation (such as a touch operation or a double-tap operation on an icon) in each user interface, or for another example, an upward or downward sliding operation, or an operation of performing a circle drawing gesture, or the like in each user interface. In some embodiments, the electronic device 100 may detect, by using the gyroscope sensor 180B, the acceleration sensor 180E, or the like, a motion gesture performed by the user holding the electronic device 100, for example, shaking the electronic device. In some embodiments, the electronic device 100 may detect a non-touch gesture operation by using the camera 193 (such as a 3D camera or a depth camera).

A software system of the electronic device 100 may use a layered architecture, an event-driven architecture, a micro-kernel architecture, a micro service architecture, or a cloud architecture. In this embodiment of the present invention, an Android system of a layered architecture is used as an example to illustrate the software structure of the electronic device 100.

Figure 10:
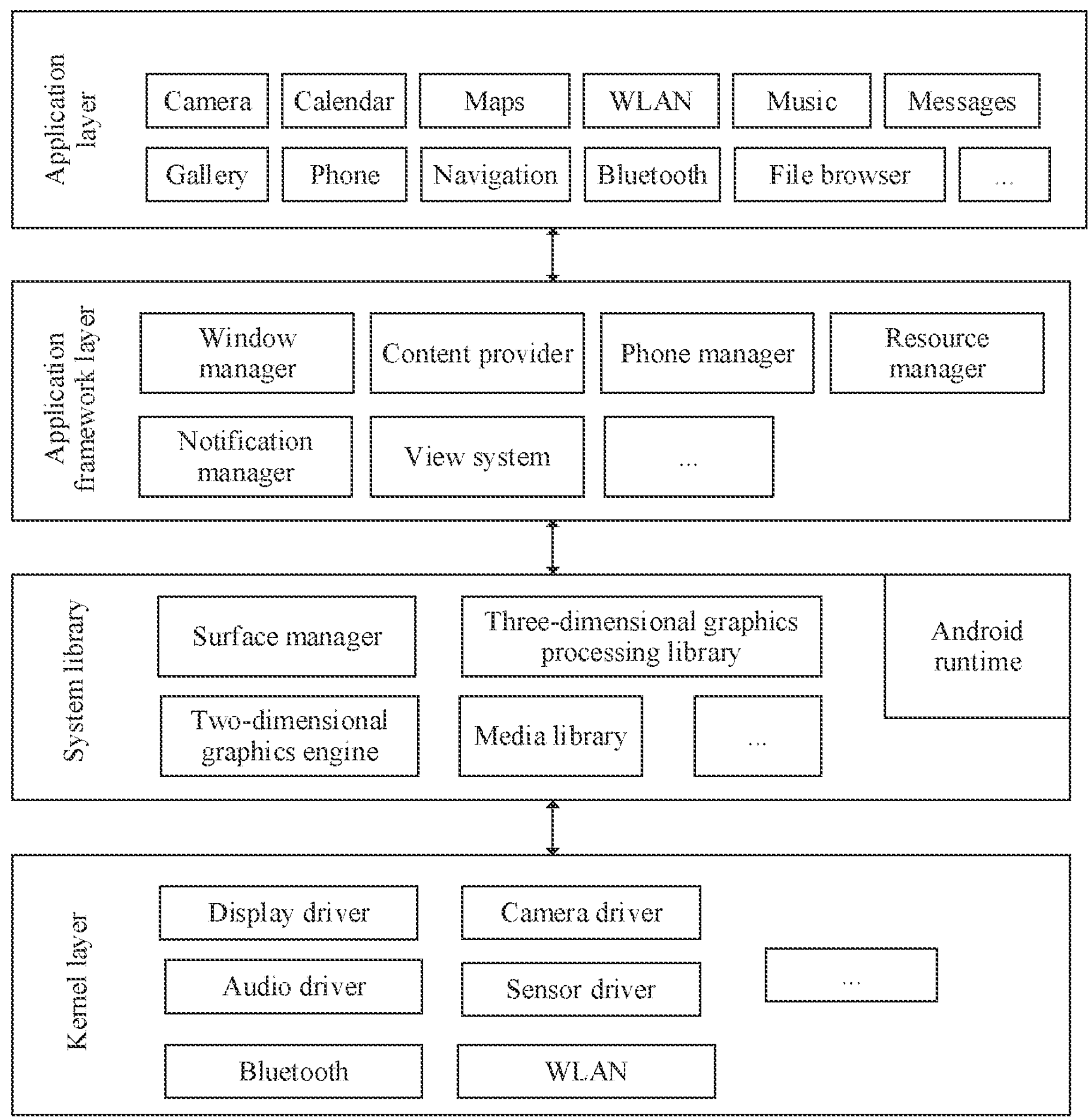
FIG. 10 is a schematic diagram of a software architecture according to an embodiment of this application.

FIG. 10 is a block diagram of the software structure of the electronic device 100 according to an embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 10, the application packages may include applications such as camera, gallery, calendar, phone, maps, navigation, WLAN, Bluetooth, music, video, and messages.

The application framework layer provides an application programming interface (application programming interface, API) and a programming framework for an application at the application layer. The application framework layer includes some predefined functions.

As shown in FIG. 10, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a notification icon of Messages may include a text display view and a picture display view.

The phone manager is configured to provide a communication function of the electronic device 100, for example, management of a call status (including answering, declining, or the like).

The resource manager provides, for an application, various resources such as a localized character string, an icon, a picture, a layout file, and a video file.

The notification manager enables an application to display notification information in the status bar, and may be configured to transmit a notification-type message. The displayed information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be called in Java language, and a kernel library of Android.

The application layer and the application framework layer run on a virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), media libraries (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of a plurality of commonly used audio and video formats, static image files, and the like. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

An embodiment of this application further provides a computer-readable storage medium All or some procedures in the foregoing method embodiments may be implemented by a computer program instructing related hardware. The program may be stored in the foregoing computer storage medium. When the program runs, the procedures in the foregoing method embodiments are performed. The computer-readable medium includes any medium that can store program code, such as a read-only memory (read-only memory, ROM), a random access memory (random access memory, RAM), a magnetic disk, or an optical disc.

In an optional design, the computer-readable storage medium may include a RAM, a ROM, an EEPROM, a CD-ROM or another optical disc memory, a magnetic disk memory or another magnetic storage device, or any other medium that may be used to carry or store required program code in a form of instructions or data structures, and can be accessed by a computer. Moreover, any connection is appropriately referred to as a computer-readable medium. For example, if a coaxial cable, an optical fiber cable, a twisted pair, a digital subscriber line (DSL), or a wireless technology (such as infrared, radio, and microwave) is used to transmit software from a website, a server, or another remote source, the coaxial cable, the optical fiber cable, the twisted pair, the DSL, or the wireless technology such as infrared, radio, and microwave is included in definition of the medium. The magnetic disk and optical disc as used herein include a compact disc (CD), a laser disc, an optical disc, a digital versatile disc (DVD), a floppy disc, and a Blu-ray disc. The magnetic disk usually reproduces data magnetically, and the optical disc reproduces data optically by using lasers. Combinations of the above should also be included within the scope of the computer-readable medium.

An embodiment of this application further provides a computer program product. All or some of the methods described in the foregoing method embodiments may be implemented by using software, hardware, firmware, or any combination thereof. When the methods are implemented by using the software, some or all of the methods may be implemented in a form of a computer program product. The computer program product includes one or more computer instructions. When the computer instructions are loaded and executed on a computer, all or some of the procedures or functions described according to the foregoing method embodiments are performed. The computer may be a general-purpose computer, a dedicated computer, a computer network, a network device, user equipment, or another programmable apparatus. The computer instructions may be stored in a computer-readable storage medium or may be transmitted by using the computer-readable storage medium. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

A sequence of the steps of the methods in embodiments of this application may be adjusted, combined, or deleted based on an actual requirement.

The modules in the apparatuses in embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, a person of ordinary skill in the art should understand that modifications to the technical solutions recorded in the foregoing embodiments or equivalent replacements to some technical features thereof may still be made, without departing from the scope of the technical solutions of embodiments of this application.

What is claimed is:

1. A method, comprising:

obtaining a first picture file comprising a format field indicating a source format and comprising a control bit, a color format, and a data field comprising first pixel data;

identifying whether the source format supports a transparent channel;

rendering, in response to identifying that the source format supports a transparent channel, the first picture file on a display with a transparent effect; and rendering, in response to identifying that the source format does not support a transparent channel, the first picture file on the display with no transparent effect.

2. The method of claim 1, further comprising controlling transparency of the first picture file using the transparent channel.

3. The method of claim 1, wherein before obtaining the first picture file, the method further comprises:

obtaining a source file of the first picture file; and performing format conversion on the source file to obtain the first picture file.

4. The method of claim 3, further comprising:

compressing the source file based on a preset compression algorithm;

filling, after compressing the source file, second pixel data into the data field when a compression ratio is greater than or equal to a threshold, wherein the compression ratio is of a first size of the source file before compressing to a second size of the source file after compressing; and filling third pixel data into the data field of the first picture file when the compression ratio is less than the threshold, wherein the compression ratio is a ratio of a size of the source file of the first picture file before the compression to a size after the compression.

5. The method of claim 4, wherein before rendering the first picture file, the method further comprises:

decompressing the data field based on a preset decompression algorithm when the data field is a compressed field, and filling fourth pixel data after decompressing into the data field; and skipping changing the data field when the data field is not a compressed field.

6. The method of claim 1, wherein the first picture file further comprises a transparent color field indicating a transparently displayed color area in the first picture file.

7. The method of claim 6, further comprising:

identifying that the source format is a third format, and wherein in response to identifying that the source format is the third format, rendering further comprises:

performing transparency processing on the first picture file based on the transparent color field and displaying the transparently displayed color area when the transparent color field is valid; and displaying, the first picture file so that it blocks a second picture file when the transparent color field is not valid.

8. The method of claim 1, further comprising:

obtaining configuration information of the display, wherein the configuration information comprises a size of the display and a display configuration of the display; and further rendering, based on the configuration information, the first picture file.

9. The method of claim 8, wherein the rendering comprises one or more of scaling, rotation, or transparent computing.

10. The method of claim 1, wherein the first picture file further comprises a palette field indicating a mapping relationship between a pixel color of the first picture file and an index number, and wherein one index number represents one color.

11. An electronic device comprising:

a display; and a processor coupled to the display and configured to:

obtain a first picture file comprising a format field indicating a source format and comprising a control bit, a color format, and a data field comprising first pixel data;

identify whether the source format supports a transparent channel;

render, in response to identifying that the source format supports a transparent channel, the first picture file on the display with a transparent effect; and render, in response to identifying that the source format does not support a transparent channel, the first picture file on the display with no transparent effect.

12. The electronic device of claim 11, wherein rendering further comprises controlling transparency of the first picture file using the transparent channel, when the source format supports the transparent channel.

13. The electronic device of claim 11, wherein before obtaining the first picture file, the processor is further configured to:

obtain a source file of the first picture file; and perform format conversion on the source file to obtain the first picture file.

14. The electronic device of claim 13, wherein the processor is further configured to:

compress the source file based on a preset compression algorithm;

fill second pixel data after compressing into the data field when a compression ratio is greater than or equal to a threshold, wherein the compression ratio is of a first size of the source file before compressing to a second size of the source file after compressing; and fill third pixel data into the data field of the first picture file when the compression ratio is less than the threshold, wherein the compression ratio is a ratio of a size of the source file of the first picture file before the compression to a size after the compression.

15. The electronic device of claim 14, wherein before rendering the first picture file, the processor is further configured to:

decompress the data field based on a preset decompression algorithm when the data field is a compressed field, and fill fourth pixel data after decompressing into the data field; and skip changing the data field when the data field is not a compressed field.

16. The electronic device of claim 11, wherein the first picture file further comprises a transparent color field indicating a transparently displayed color area in the first picture file.

17. The electronic device of claim 16, wherein the processor is further configured to:

identify that the source format is a third format; and in response to identifying that the source format is the third format, the rendering further comprises:

performing transparency processing on the first picture file based on the transparent color field and displaying the transparently displayed color area when the transparent color field is valid; and displaying the first picture file so that it blocks a second picture file when the transparent color field is not valid.

18. The electronic device of claim 11, wherein the processor is further configured to:

obtain configuration information comprising a size of the display and a display configuration of the display; and further render, based on the configuration information, the first picture file.

19. The electronic device of claim 18, wherein the rendering comprises one or more of scaling, rotation, or transparent computing.

20. The electronic device of claim 11, wherein the first picture file further comprises a palette field indicating a mapping relationship between a pixel color of the first picture file and an index number, and wherein one index number represents one color.

* * * * *